US012748979B2

(12) United States Patent
Katz et al.

(10) Patent No.: US 12,748,979 B2
(45) **Date of Patent: *Sep. 29, 2026**

(54) ARCHITECTURES, SYSTEMS AND METHODS HAVING SEGREGATED SECURE AND PUBLIC FUNCTIONS

(71) Applicant: MILESTONE ENTERTAINMENT, LLC, Beverly Hills, CA (US)

(72) Inventors: Randall M. Katz, Beverly Hills, CA (US); Robert Tercek, Los Angeles, CA (US)

(73) Assignee: MILESTONE ENTERTAINMENT, LLC, Beverly Hills, CA (US)

( * ) Notice: Subject to any disclaimer, the term of this patent is extended or adjusted under 35 U.S.C. 154(b) by 290 days.

This patent is subject to a terminal disclaimer.

(21) Appl. No.: 18/674,978

(22) Filed: May 27, 2024

(65) Prior Publication Data

US 2025/0165776 A1 May 22, 2025

Related U.S. Application Data

(63) Continuation of application No. 18/196,470, filed on May 12, 2023, now Pat. No. 11,995,549, which is a (Continued)

(51) Int. Cl.
*G06N 3/09* (2023.01)
*G06F 9/54* (2006.01)
(Continued)

(52) U.S. Cl.
CPC ............... *G06N 3/092* (2023.01); *G06F 9/54* (2013.01); *G06F 21/316* (2013.01); *G06F 21/53* (2013.01);
(Continued)

(58) Field of Classification Search
CPC ........... G06N 3/08; G06N 3/02; G06N 20/00; G06N 3/006; G06N 3/04; G06N 5/04;
(Continued)

(56) References Cited

U.S. PATENT DOCUMENTS 6,488,280 B1 12/2002 Katz et al.
6,565,084 B1 5/2003 Katz et al.
(Continued)

OTHER PUBLICATIONS

Ali, Muneeb, et al., "Blockstack: A global naming and storage system secured by blockchains." 2016 {USENIX} Annual Technical Conference ({USENIX}-{ATC} 16) 2016. (Year: 2016).
(Continued)

*Primary Examiner* — Dave Misir
(74) *Attorney, Agent, or Firm* — David B Murphy

(57) ABSTRACT

A system is provided for control of an entertainment state system having segregated secure functions and public functions for use by one or more users of the system. First, a public interface portal receives instructions regarding operation of the entertainment state system from the one or more users. The interface portal includes a first interface, a processor, a graphical user interface (GUI) coupled to the processor, a control unit in operative communication with the processor and graphical user interface, and a second interface providing an application program interface (API). Secondly, a secure entity unit is provided, the secure entity unit including a receive interface, the receive interface adapted to receive a call from the application program interface (API) of the interface portal, a send interface, the send interface adapted to provide a response to the interface portal interface, a game engine, and a financial engine.

20 Claims, 17 Drawing Sheets

Control Plane Layer Explosion

Related U.S. Application Data continuation of application No. 17/882,054, filed on Aug. 5, 2022, now Pat. No. 11,651,217, which is a continuation of application No. 17/410,365, filed on Aug. 24, 2021, now Pat. No. 11,410,039, which is a continuation of application No. 17/015,938, filed on Sep. 9, 2020, now Pat. No. 11,120,335, which is a continuation of application No. 16/686,484, filed on Nov. 18, 2019, now Pat. No. 10,776,696, which is a continuation of application No. 16/052,470, filed on Aug. 1, 2018, now Pat. No. 10,489,709, which is a continuation of application No. 15/886,432, filed on Feb. 1, 2018, now abandoned.

(60) Provisional application No. 62/454,423, filed on Feb. 3, 2017.

(51) Int. Cl.

| | |
|---|---|
| ***G06F 21/31*** | (2013.01) |
| ***G06F 21/53*** | (2013.01) |
| ***G06N 3/006*** | (2023.01) |
| ***G06N 3/092*** | (2023.01) |
| ***G06Q 20/06*** | (2012.01) |
| ***G06Q 20/12*** | (2012.01) |
| ***G06Q 20/36*** | (2012.01) |
| ***G06Q 20/38*** | (2012.01) |
| ***G06V 40/16*** | (2022.01) |
| ***G07F 17/32*** | (2006.01) |
| ***H04L 9/40*** | (2022.01) |
| *G06N 5/04* | (2023.01) |

(52) U.S. Cl.

CPC ........... *G06N 3/006* (2013.01); *G06Q 20/065* (2013.01); *G06Q 20/0655* (2013.01); *G06Q 20/12* (2013.01); *G06Q 20/3678* (2013.01); *G06Q 20/389* (2013.01); *G06V 40/16* (2022.01); *G07F 17/3206* (2013.01); *G07F 17/3225* (2013.01); *G07F 17/3237* (2013.01); *G07F 17/3241* (2013.01); *G07F 17/329* (2013.01); *H04L 63/102* (2013.01); *G06N 5/04* (2013.01); *G06Q 2220/00* (2013.01)

(58) Field of Classification Search

CPC .. G06N 3/092; G06K 9/00221; G06Q 20/065; G06Q 20/0655; G06Q 20/12; G06Q 2220/00; G06Q 20/389; G07F 17/329; G07F 17/3206; G07F 17/3225; G07F 17/3237; G07F 17/3241; G06V 40/16; H04L 63/102; G06F 9/54; G06F 21/316; G06F 21/53; A63F 13/67

USPC ............................................................ 706/25

See application file for complete search history.

(56) References Cited

U.S. PATENT DOCUMENTS

| | | | | |
|---|---|---|---|---|
| 6,811,484 | B2 | 11/2004 | Katz et al. | |
| 6,916,247 | B2 | 7/2005 | Gatto et al. | |
| 7,798,896 | B2 | 9/2010 | Katz et al. | |
| 7,814,038 | B1 | 10/2010 | Repici | |
| 8,241,100 | B2 | 8/2012 | Katz et al. | |
| 8,241,110 | B2 | 8/2012 | Katz et al. | |
| 8,393,946 | B2 | 3/2013 | Katz et al. | |
| 8,535,134 | B2 | 9/2013 | Katz et al. | |
| 8,583,556 | B2 | 11/2013 | Dunkeld et al. | |
| 8,727,853 | B2 | 5/2014 | Katz et al. | |
| 9,137,107 | B2 | 9/2015 | Koponen et al. | |
| 9,480,188 | B2 | 10/2016 | Orsini et al. | |
| 9,734,659 | B2 | 8/2017 | Ovalle | |
| 9,853,977 | B1 | 12/2017 | Laucius et al. | |
| 10,134,232 | B2 | 11/2018 | Preisach | |
| 10,340,038 | B2 | 7/2019 | Witchey | |
| 10,354,325 | B1 | 7/2019 | Skala et al. | |
| 10,445,643 | B2 | 10/2019 | Katz et al. | |
| 10,489,709 | B2 | 11/2019 | Katz et al. | |
| 10,496,923 | B2 | 12/2019 | Katz et al. | |
| 10,679,128 | B2 | 6/2020 | Katz et al. | |
| 10,713,564 | B2 | 7/2020 | Katz et al. | |
| 10,776,696 | B2 | 9/2020 | Katz et al. | |
| 10,902,320 | B2 | 1/2021 | Katz et al. | |
| 11,042,801 | B2 | 6/2021 | Katz et al. | |
| 11,069,000 | B1 | 7/2021 | Serrano et al. | |
| 11,087,214 | B2 | 8/2021 | Katz et al. | |
| 11,120,335 | B2 | 9/2021 | Katz et al. | |
| 11,315,017 | B2 | 4/2022 | Katz et al. | |
| 11,410,039 | B2 | 8/2022 | Katz et al. | |
| 11,455,537 | B2 | 9/2022 | Katz et al. | |
| 11,455,642 | B1 | 9/2022 | Jameson et al. | |
| 11,562,242 | B2 | 1/2023 | Katz et al. | |
| 11,651,217 | B2 | 5/2023 | Katz et al. | |
| 11,651,219 | B2 | 5/2023 | Katz et al. | |
| 11,847,529 | B2 | 12/2023 | Katz et al. | |
| 11,995,549 | B2 | 5/2024 | Katz et al. | |
| 2002/0029183 | A1 | 3/2002 | Vlahoplus et al. | |
| 2003/0100372 | A1* | 5/2003 | Gatto | G07F 17/3232 463/42 |
| 2008/0020814 | A1* | 1/2008 | Kernene | H04N 21/435 463/25 |
| 2008/0175377 | A1 | 7/2008 | Merrill | |
| 2011/0065490 | A1 | 3/2011 | Lutnick | |
| 2013/0325773 | A1* | 12/2013 | Sinyavskiy | G06N 20/00 706/23 |
| 2015/0039745 | A1 | 2/2015 | Degioanni | |
| 2015/0141123 | A1 | 5/2015 | Callaway | |
| 2015/0170112 | A1 | 6/2015 | DeCastro | |
| 2016/0042359 | A1* | 2/2016 | Singh | G06F 40/30 704/2 |
| 2016/0104346 | A1* | 4/2016 | Ovalle | G07F 17/3223 463/17 |
| 2016/0123620 | A1 | 5/2016 | Orsani et al. | |
| 2016/0300442 | A1* | 10/2016 | Preisach | G07F 17/3255 |
| 2016/0364419 | A1 | 12/2016 | Stanton et al. | |
| 2016/0371771 | A1 | 12/2016 | Serrano et al. | |
| 2016/0379213 | A1 | 12/2016 | Isaacson et al. | |
| 2017/0116693 | A1 | 4/2017 | Rae | |
| 2017/0124812 | A1* | 5/2017 | Washington | G07F 17/3269 |
| 2017/0178237 | A1 | 6/2017 | Wong et al. | |
| 2017/0286530 | A1 | 10/2017 | Paruchuri et al. | |
| 2017/0352012 | A1 | 12/2017 | Hearn et al. | |
| 2017/0359408 | A1 | 12/2017 | Kurian et al. | |
| 2018/0005272 | A1 | 1/2018 | Todasco et al. | |
| 2018/0096163 | A1 | 4/2018 | Jacques De Kadt et al. | |
| 2018/0114205 | A1 | 4/2018 | Thomas et al. | |
| 2018/0196694 | A1 | 7/2018 | Banerjee et al. | |
| 2018/0198800 | A1* | 7/2018 | Krasser | G06N 20/00 |
| 2018/0247191 | A1 | 8/2018 | Katz et al. | |
| 2018/0350451 | A1 | 12/2018 | Ohnemus et al. | |
| 2018/0374097 | A1 | 12/2018 | Hanna | |
| 2019/0246463 | A1 | 8/2019 | Williams et al. | |
| 2020/0312038 | A1 | 10/2020 | Samec et al. | |
| 2023/0281449 | A1 | 9/2023 | Katz et al. | |
| 2023/0281450 | A1 | 9/2023 | Katz et al. | |
| 2024/0127053 | A1 | 4/2024 | Katz et al. | |
| 2024/0127063 | A1 | 4/2024 | Katz et al. | |

OTHER PUBLICATIONS

Arm, IBM, "The Internet of Things Business Index 2017, Transformation In Motion", The Economist, Intelligence Unit Limited 2017, pp. 1-22.

Christidis, Konstantinos, and Michael Devetsikiotis. "Blockchains and smart contracts for the internet of things." IEEE Access 4 (2016): 2292-2303. PA (Year: 2016).

Crosby, et al., "Blockchain Technology: Beyond Bitcoin", Applied Innovation Review, Issue No. 2, Sutardja Center for Entrepreneurship & Technology, Berkeley Engineering, Jun. 2016, pp. 1-19.

(56) References Cited

OTHER PUBLICATIONS

Fisher, "Decentralized Peer to Peer Game Assets Platform, Integration with Third Party Games using Smart Contract," Aug. 4, 2014, 12 pages.
Goyani et al. "Judgmental Feature Based Facial Expression Recognition Systems and FER Datasets—A Comprehensive Study" published in International Journal of Next-Generation Computing, vol. 8, No. 1, Mar. 2017 (Year:2017).
Hinton et al., "A Fast Learning Algorithm For Deep Belief Nets", Neural Computation, 18, 1527-1554, 2006.
Jouppi, et al., "In-Datacenter Performance Analysis of a Tensor Processing Unit™M", To appear at the 44$^{th}$ International Symposium on Computer Architecture (ISCA), Toronto, Canada, Jun. 26, 2017, pp. 1-17.
LeCun, et al., "Deep Learning", Nature, vol. 521, May 28, 2015, pp. 436-444.
Marvin, "Blockchain A-Z: Everything You Need to Know About the Game-Changing Tech Beneath Bitcoin", Jun. 3, 2016, 9 pages.
Marvin, "Blockchain: The Invisible Technology That's Changing the World", Feb. 6, 2017, 32 pages.
Mougayar, The Business Blockchain, pp. 6-9, 128-133, 2016, published by John Wiley & Sons, Hoboken, New Jersey.
Mueller, Flexible Cross Layer Optimization for Fixed and Mobile Broadband Telecommunication Networks and Beyond, Doctoral Thesis, Technical University of Berlin, 2014, pp. 1-254 (Year: 2014).
Nakamoto, "Bitcoin—A Peer to Peer Electronic Cash System", 2008, pp. 1-9.
Ng, "What Artificial Intelligence Can and Can't Do Right Now", Harvard Business Review, Nov. 9, 2016, 5 pages.
O'Dowd, et al., "IBM's Open Blockchain, Making Blockchain Real for Enterprises", IBM Blockchain, Apr. 2016, pp. 1-20.
Ren, Jimmy, SJ, and Li Xu. "On vectorization of deep convolutional neural networks for vision tasks." Twenty-Ninth AAAI Conference on Artificial Intelligence. 2015 (Year: 2015).
Ronan, "Deep Learning predicts Loto Numbers", Academy of Paris, Apr. 1, 2016, pp. 1-4.
Smart Contract Alliance, "Smart Contracts: 12 Use Cases for Business and Beyond, A Technology, Legal & Regulatory Information, prepared by Smart Contracts Alliance—In collaboration with Deloitte, An industry initiative of the Chamber of Digital Commerce", Dec. 2016, pp. 1-53.
Turing, "Computing Machinery and Intelligence", Mind 49: 1950, pp. 433-460.
Wall, Eric Using Blockchain Technology and Smart Contracts to Create a Distributed Securities Depository (Year: 2016).
Watanabe et al. Blockchain contract: Securing a blockchain applied to smart contracts (Year 2016).
Wood, "Ethereum: A Secure Decentralized Generalized Transaction Ledger", Homestead Draft, 2014, pp. 1-32.
Wu, et al., "Google's Neural Machine Translation System: Bridging the Gap between Human and Machine Translation", Oct. 8, 2016, pp. 1-23.
Yli-Huumo, et al., "Where Is Current Research on Blockchain Technology? A Systematic Review", Oct. 3, 2016, pp. 1-27.

* cited by examiner

Prior Art Centralized System

Prior Art Decentralized System

Programmatically Defined Gaming System

Application Plane Layer Explosion

Control Plane Layer Explosion

State Data Plane Layer Explosion

Ecosystem Interfaces and Interconnections

Neural Network Model Architecture

Neural Network

Dynamic Systems d-API

Dynamic Systems d-SDK

Architecture

Permissioned System

Blockchain Platform

Platform

Schematic of a Decentralized Cryptocurrency System with Smart Contracts

Schematic of Sequential Hash Value Creation
(Hash Value Plus Block Plus Nonce -> New Hash Value)

Flowchart for Crypto Currency Lottery

Smart Contract

Smart-Smart (Smart$^2$) Contracts

Smart Contracts with Mandated and Variable Parameters

Cryptocurrency Wallet

Schematic Diagram Segregated Public and Secure Functions

Interface of Segregated Secure and Public Functions

Network Implementation of Segregated Secure and Public Functions

Centralized + Decentralized Systems

Hierarchical Systems

Lottery Linked Credit Card

ARCHITECTURES, SYSTEMS AND METHODS HAVING SEGREGATED SECURE AND PUBLIC FUNCTIONS

PRIORITY CLAIM

This is a continuation of application Ser. No. 18/196,470, filed May 12, 2023, now issued as U.S. Pat. No. 11,995,549 on May 28, 2024, which is a continuation of application Ser. No. 17/882,054, filed Aug. 5, 2022, now issued as U.S. Pat. No. 11,651,217 on May 16, 2023, which is a continuation of application Ser. No. 17/410,365, filed Aug. 24, 2021, now issued as U.S. Pat. No. 11,410,039 on Aug. 9, 2022, which is a continuation of application Ser. No. 17/015,938, filed Sep. 9, 2020, now issued as U.S. Pat. No. 11,120,355 on Sep. 14, 2021, which is a continuation of application Ser. No. 16/686,484, filed Nov. 18, 2019, now issued as U.S. Pat. No. 10,776,696 on Sep. 15, 2020, which is a continuation of application Ser. No. 16/052,470, filed Aug. 1, 2018, now issued as U.S. Pat. No. 10,489,709 on Nov. 26, 2019, which is a continuation of application Ser. No. 15/886,432, filed Feb. 1, 2018, which claims benefit of provisional Application No. 62/454,423, filed Feb. 3, 2017, which are incorporated herein by reference as if fully set forth herein.

FIELD OF THE INVENTION

The present inventions relate to architectures, systems and methods for programmatically controlled entertainment state systems. More particularly, architectures, systems and methods for program control utilizing cognitive computing, including but not limited to artificial intelligence and machine learning, and optionally including analytics. Systems, methods and architectures are provided for game and entertainment operations are provided utilizing decentralized systems, including blockchain, optionally in peer to peer systems. More particularly, systems and methods for implementing a lottery, game or entertainment utilizing cryptocurrency, such as bitcoin, in a decentralized system.

BACKGROUND OF THE INVENTION

History shows that many trusted systems have evolved in order to provide for efficient functioning of society and business. Generally, these have involved central control of systems in order to ensure compliance with rules. Within the gaming space, examples include lotteries and regulated gaming. By way of example, the Nevada Gaming Control Board monitors institutions within the state for compliance with laws and regulations, and ensures the fair and efficient functioning of the industry.

Consider the entertainment and gaming system background. A lottery is a 'State' Function and serves as a form of 'trusted agent'. The classic definition of the elements of a lottery are prize, chance and consideration. When these elements are reordered into a more chronologically correct order, namely first, receipt and holding of the consideration (e.g., ticket purchases), chance (e.g., ensuring a fair and accurate random number generator) and prize (i.e., paying the prize to the true winner.) Therefore, the State acts as a 'trusted agent' as it holds the consideration, guarantees randomness of the 'chance', and pays out the prize (title transfer). 'Trust' is based on the Integrity and Trustworthiness of People Operating the System and the Regulators Who Oversee the System. Lotteries or State Regulators are often former law enforcement. The degree of trust in the Regulators is often based on time and track record, e.g., the State of Nevada Regulatory system is considered highly trustworthy and effective, based in part on a multi-decade long track record. Additionally, a State with the most business to lose from a loss of trust in the regulatory process is most motivated to provide regulation. Such systems are based on central control of the system.

A casino is a 'state regulated' function and a form of 'trusted agent' with 'verification'. They are licensed by the State and subject to state inspection.

Various advancements have been made in the gaming and entertainment environment. The following are assigned to the assignee of this, and are hereby incorporated by Reference as if fully set forth herein: Games, And Methods For Improved Game Play In Games Of Chance And Games Of Skill, U.S. Pat. No. 6,565,084, Games, and Methods and Apparatus for Game Play in Games of Chance, U.S. Pat. No. 6,488,280, Games, and Methods and Apparatus for Game Play in Games of Chance, U.S. Pat. No. 6,811,484, Apparatus and Method for Game Play in an Electronic Environment, U.S. Pat. No. 8,393,946, Apparatus, Systems and Methods for Implementing Enhanced Gaming and Prizing Parameters in an Electronic Environment, U.S. Pat. No. 7,798,896, Apparatus, Systems and Methods for Implementing Enhanced Gaming and Prizing Parameters in an Electronic Environment, U.S. Pat. No. 8,241,110, Methods and Apparatus for Enhanced Play in Lottery and Gaming Environments, U.S. Pat. No. 8,727,853, Methods and Apparatus for Enhanced Interactive Game Play in Lottery and Gaming Environments, U.S. Pat. No. 8,241,100, Method and System for Electronic Interaction In A Multi-Player Gaming System, U.S. Pat. No. 8,535,134. Generally, they comprise a suite of tools to make systems more engaging, and to optimize results.

One vexing problem in larger systems results from systems incompatibility. Various components often come from various vendors. There is often a lack of interoperability and incompatibility. Various systems in the gaming ecosystem need to interoperate, including but not limited to: gaming operations, marketing, CRM (Customer Relationship Management), loyalty programs, Ancillary Points or Credits, System Analytics and Optimization, and account and audit functions.

Software Defined Systems are a collection of modules interoperated under a higher level of software control. These manage network services through abstraction of lower level functionality. Generally, there is an Application Plane, a Control Plane and a Data Plane. Examples include Software Defined Networks having a Control Plane which provides intelligent control of data plane composed of relatively less intelligent switches, routers, storage. Yet another example is software defined radio. The control plane monitors and supervises use of frequency bands in the data plane.

Yet another component is the use of static interfaces and tools. For example, APIs or Application Programming Interfaces generally comprise a static interface. They define a format for an information request. 'If you ask for X in a specific way, we will provide Y'. Generally, no access is provided by requestor to the system other than via API. Yet another system are SDKs or Software Development Kit. They may be static. Tools are provided to achieve desired results. GDKs or Game Development Kit also may be static and provide tools for game development.

The design of entertainment or games is often driven by metrics driven design. This often involves A/B Testing comparing the results or favorability as between multiple systems. Further, they often monitor multivariate response systems.

One aspect of lotteries and Lotto style games is that they tend to be static. At the most extreme example, they are literally printed on cardstock. More generally, once a format for a lottery game has been chosen, such as a 6 out of 49 format, it is difficult to change. Public perception of change is that the game has become less favorable to the player.

Problem gambling issues have plagued the gaming industry. It is a significant issue for society. While users can solicit help (e.g., 1-800-Gambling), there is often denial and an unwillingness to seek help. Various attempts have been made to limit abuse, such as use rate limits in some on-line games.

In the move from bricks and mortar to on-line and cyber spheres, identity issues proliferate. Issues include: are you who you purport to be and will the user's identity be compromised?

Significant advances have been made in cognitive intelligence and adaptive intelligence. For example, IBM Watson won a Jeopardy competition 2011 against highly skilled players. Deep learning and pattern recognition has occurred. Current trends include big data, pattern recognition and machine learning.

Recent advances have also been made in object detection, both in 2D and 3D space. A challenge in the Large Scale Visual Recognition Challenge (LSVRC) provides for Object Detection in ImageNet 2016. The error rate of automatic labeling of ImageNet declined to less than 3%, compared to human performance of about 5%.

Significant advances have also been made in machine based game play performance. In 2015, Google DeepMind used an artificial intelligence reinforcement learning system to learn how to play 49 Atari games. In 2016, AlphaGo system from Google DeepMind beat one of the world's greatest Go players 4-1. In 2017, Carnegie Mellon University's Libratus program defeated top human players in a statistically significant manner.

Further advances have been made in cloud based systems. Functions have been migrating from local servers and storage to remote 'cloud' storage. These systems provide for easy scalability. Clouds based systems may run multiple 'instances' simultaneously. They also may combine software as a service, including Artificial Intelligence ("AI").

The Internet of Things ("IoT") utilizes devices capable of sending data to remote location, and receiving command data. Various voice controlled devices use AI or machine learning ("ML"), e.g., Amazon Alexa, Google Dot.

FIG. 1 shows an exemplary prior art centralized system. FIG. 2 shows an exemplary prior art distributed system.

Advancements have been made in trusted distributed systems such as in the use of blockchain based systems. The initial disclosure of the blockchain technology is attributed to Satoshi Nakamoto in a paper published October 2008. This system provides for automatic trust or system trust. The blockchain paradigm provides for a decentralized system utilizing decentralized consensus. This can be done in a peer-to-peer manner without an intermediary. The system may be viewed as a network of nodes running software on a programmable distributed network. It is sometimes referred to as a transaction singleton machine with shared state, a transaction based state machine, a message passing framework, a trustful object messaging compute framework and trusted computing.

A decentralized consensus is established by a combination of blockchain and cryptography. Authority and trust is provided by the decentralized virtual network. Consensus logic is generally separate from the application. It may comprise the first layer of a decentralized architecture.

Blockchain utilizes a distributed ledger. A 'block' comprises a new group of accepted transactions. A batch of transactions is released in a block to be validated by the network of participating computers. Continuous, sequential transaction record on a public block creates a unique "chain" or blockchain. This block is published to all other nodes. The publication occurs periodically, e.g. every 10 minutes.

Etherium is an open source platform for smart contracts. As currently operated, Etherium is a decentralized platform that runs smart contracts: applications that run exactly as programmed without any possibility of downtime, censorship, fraud or third party interference. The applications run on a custom built blockchain, an extremely powerful shared global infrastructure that can move the value and represent ownership of the property. This allows developers to create markets, store debt or promise records, move funds according to long-standing instructions (such as a will or a futures contract), without the counterparty risk. Etherium also states that its goal is to create a tradeable digital token that can be used as a currency, a representation of an asset, a virtual share, a proof of membership or anything at all. These tokens use a standard coin API, so the contract will be automatically compatible with any wallet, other contract or exchange also using this standard. The total amount of tokens in circulation can be set to a simple fixed amount or fluctuate based on any programmed ruleset. In summary, Etherium states that it enables building a tradeable token with a fixed supply, a central bank that can issue money and a puzzle-based cryptocurrency.

There are many disadvantages to the current systems. They are slow to change and innovate. They often involve proprietary systems that do not interoperate. There is often governmental and or institutional bias. There may be a cumbersome regulatory environment. Finally, there are often high transaction costs.

Thus, there is a need for interoperability among inconsistent, often proprietary systems. There is a need for gambling limitation on a more global basis, including geo-limitation and global use rate monitoring for problem gambling. There is a need for problem gambling detection and remediation. There is a need for improved distributed systems.

SUMMARY OF THE INVENTION

In one aspect, the inventions comprise a system for control of an entertainment state system having segregated secure functions and public functions for use by one or more users of the system. First, a public interface portal receives instructions regarding operation of the entertainment state system from the one or more users. The interface portal includes a first interface to receive instructions from and communicate to the one or more end users, a processor, a graphical user interface (GUI) coupled to the processor, a control unit in operative communication with the processor and graphical user interface, and a second interface providing an application program interface (API). Secondly, a secure entity unit is provided, the secure entity unit including a receive interface, the receive interface adapted to receive a call from the application program interface (API) of the interface portal, a send interface, the send interface adapted to provide a response to the interface portal interface, a game engine, and a financial engine. Preferably the financial engine is coupled to the game engine, the receive interface and the send interface.

Systems and methods are provided for training an artificial intelligence system including the use of one or more human subject responses to stimuli as input to the artificial intelligence system. One or more displays are oriented toward the human subjects to present the stimuli to the human subjects. One or more detectors serve to monitor the reaction of the human subjects to the stimuli, the detectors including at least motion detectors, the detectors providing an output. An analysis system is coupled to receive the output of the detectors, the analysis system providing an output corresponding to whether the reaction of the human subjects was positive or negative. A neural network utilizes the output of the analysis system to provide a positive weighting for training of the neural network when the output of the analysis system was positive, and a negative weighting for training of the neural network when the output of the analysis system was negative.

DETAILED DESCRIPTION OF THE INVENTION

Architectures, Systems and Methods for Program Defined Entertainment State Systems.

The following description is primarily in connection with FIGS. 3, 4, 5 and 6, but may apply to other figures as well. An architecture is provided for a program defined entertainment state system. This preferably serves to decouple the system that controls the overall experience from the underlying systems that define states. The first plane, the application plane provides an interface, primarily for system side users, e.g., developers, organizers of events, contests, lotteries. The second plane, the control plane, provides for intelligent control, especially cognitive computing, including artificial intelligence and/or machine learning, including artificial intelligence where the system learns over time. This preferably provides an intelligent control layer above modules. The third plane, the state data plane, provides for entertainment 'state modules' with various mechanics, preferably including 'core loop', meta states and provides interfaces for end users, as well as inputs and outputs.

Figure 1:
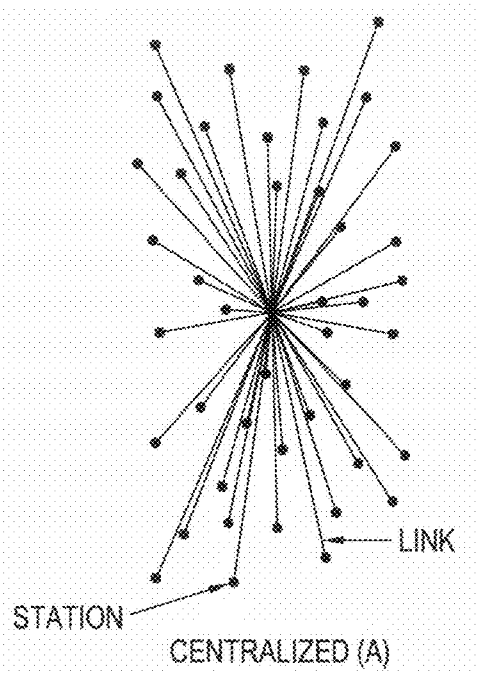
FIG. 1 (Prior Art)
FIG. 1 is a diagrammatic view of a prior art centralized system.
Figure 2:
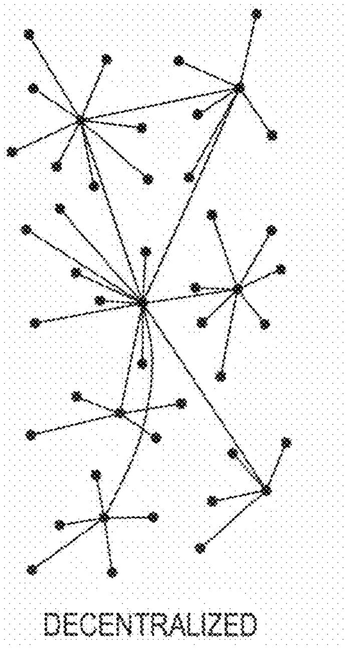
FIG. 2 (Prior Art)
FIG. 2 is a diagrammatic view of a prior art centralized system.
Figure 3:
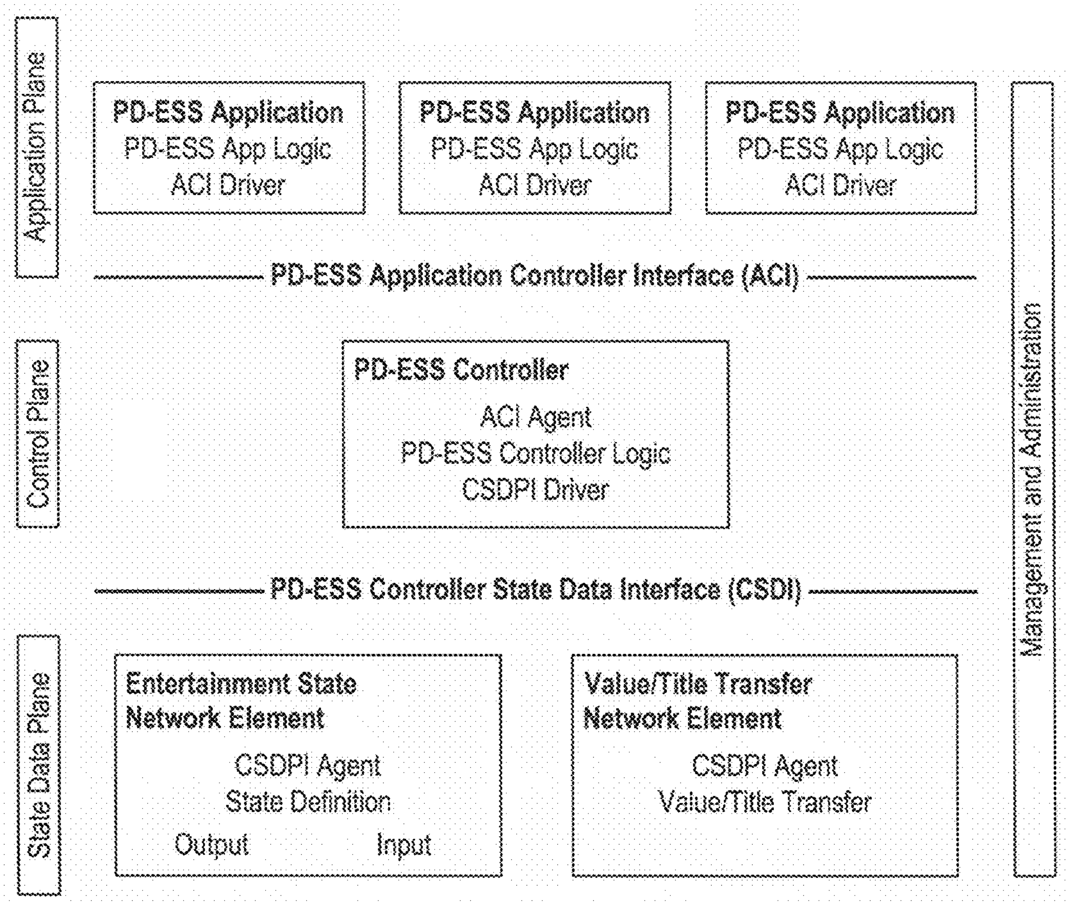
FIG. 3 is a system level block diagram of the program defined entertainment state system (PD-ESS) showing the application plane, the control plane and the state data plane.
Figure 4:
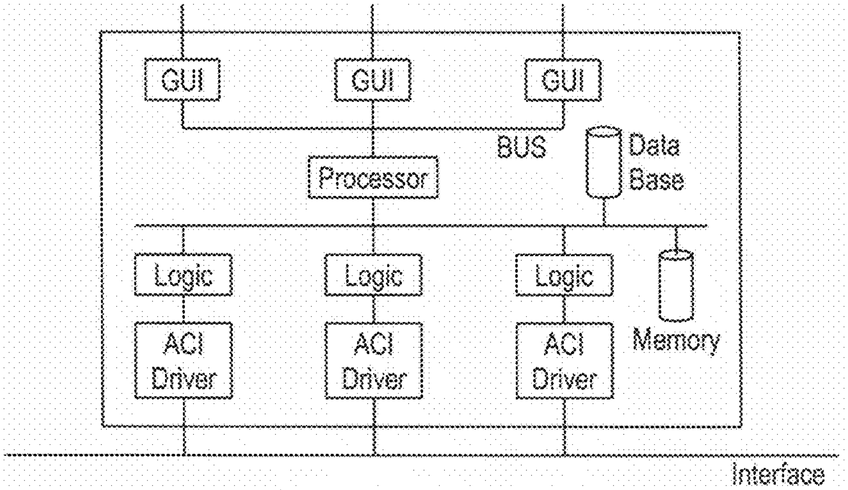
FIG. 4 is a system level block diagram explosion of the application state plane layer of the PD-ESS.
Figure 5:
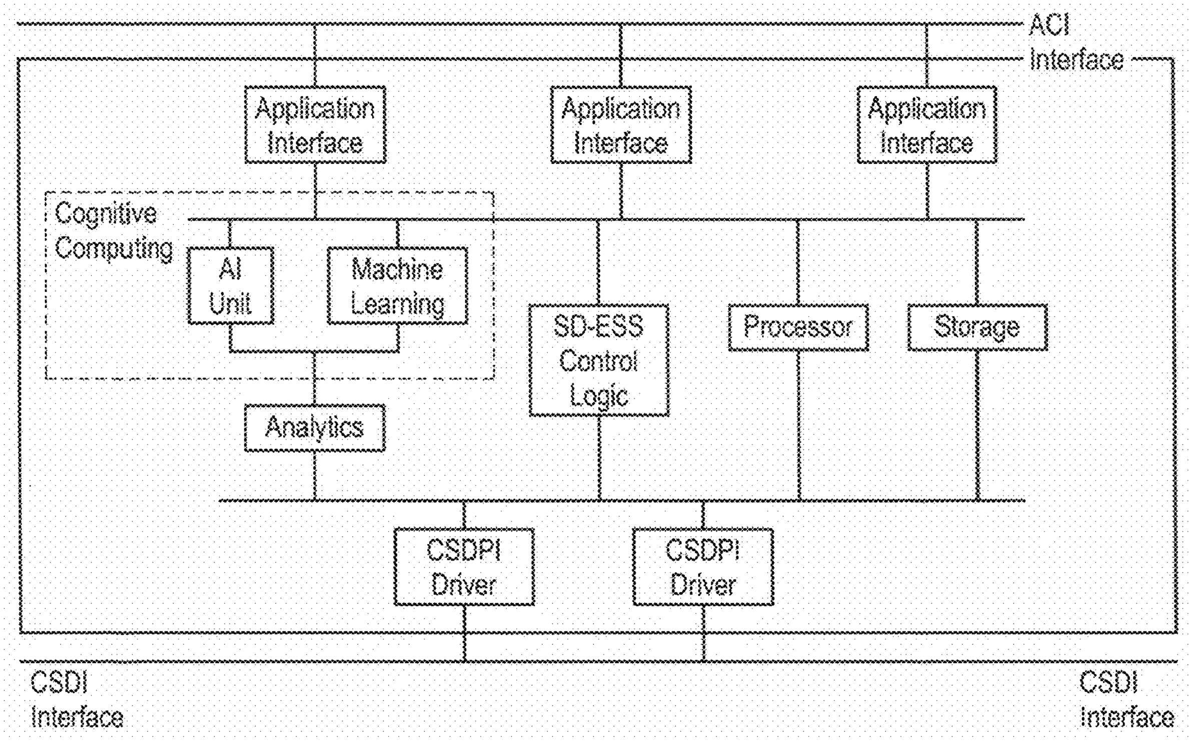
FIG. 5 is a system level block diagram explosion of the control plane layer of the PD-ESS.
Figure 6:
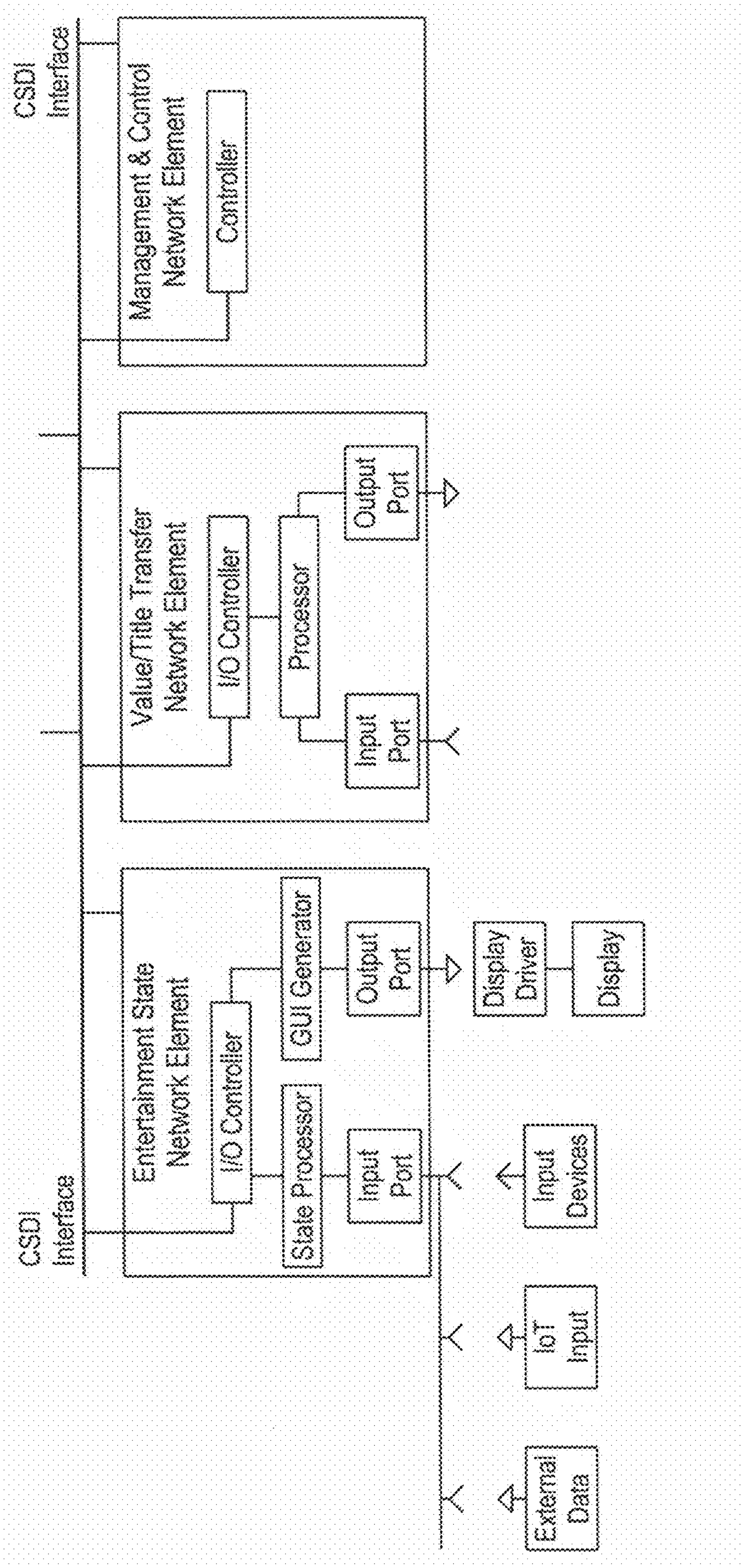
FIG. 6 is a system level block diagram explosion of the state data plane layer of the PD-ESS.

FIG. 3 provides a block Diagram Program Defined Entertainment State System (PD-ESS). FIG. 4 is an Explosion of PD-ESS Application Plane Layer, including an application layer GUI (facing the Developers, Affiliates, and Charities). FIG. 5 provides an Explosion PD-ESS controller plane layer. FIG. 6 provides an explosion PD-ESS state data plane layer. Also included are an explosion of entertainment state network element layer, a user interface GUI, an explosion of value/title transfer network element and explosion of other functional blocks.

Turning first to the Application Plane Layer, a program serves to communicate requirements and desired behavior to the PD-ESS Controller. It provides communication between the PD-ESS Application and PD-ESS Controller via the PD-ESS Application Controller Interface (ACI). Application Logic and Drivers are optionally provided. The application layer may receive an abstracted view of State Data Plane Actions. The PD-ESS Applications may interface with higher levels of abstracted control. The system includes an interface, the PD-ESS Application Controller Interface (ACI). The management and administration preferably provides the following: (1) To/From Application Plane, it provides contracts and SLAs, (2) To/from Control Plane Configure Policy, Monitor Performance, and (3) To/From Data Plane Element Setup.

Turning second to the Control Plane Layer, the PD-ESS Controller is ideally logically centralized entity, preferably serves to translate the requirements of the PD-ESS Application to the State Data Plane layer, and provides the Application layer with actions in the State Data Plane (e.g., event information and statistical information). The control plane may provide statistics, events and states from the Data Plane to the Application Plane. The control plane preferably enforces behavior at a low level control in the data plane, provides capability discovery, and monitors statistics and faults. The control plane advantageously includes cognitive computing, such as artificial intelligence (AI) and machine learning (ML), to be described in greater detail, below.

The control plane may optionally include analytics, including but not limited to pattern recognition. Analytics may be performed on a population, preferably a relevant population, or on a subset. Preferably, the subset has similar characteristics of a target user. Data may be binned according to subset. The scope of primary data may be analyzed. Predictive modeling may be included. Responsible Gaming Control may be implemented at the control plane level, especially if there are use rate limits and global limits.

Turning thirdly to the state data plane layer, it preferably includes main subcomponents and Functional Network Elements. Optionally, the functional network elements include some or all of the following: 1. Entertainment State Network Elements, 2. Value/Title Transfer Network Element, 3. Game Library, such as Casino, VLT, Video Gaming, Tournament, Amusement with Prize (AWP), Game Mechanics, Core Loop, Skill, Skill with Reveal, Second Chance, Social, Gamification, Prizing, vGLEPs and Prize Board, 4. Systems, Marketing, Promotions, CRM, Operations, Logistics, Interactive, Mobile/Apps and Responsive Design, 5. Platforms, 6. Channels, 7. Lottery, including Retail and Central Systems, 8. Loyalty, 9. Responsible Gaming Control, optionally including use rate limits and global limits (may be done in the control plane layer as well), 10. Sports, including real world, fantasy and eSports, 11. Other Live Data Entertainment, 12. Networks, including Network communications and web services and 13. Management, including Records, Player Account Management, Reporting, Compliance, including regulatory compliance, security, including cybersecurity, fraud and risk management, including preferably audit and payment.

The Entertainment State Network Elements provide an interface for interaction with a user of the system. An input receives information from user selection. Sensors may be of various forms, including sound sensors, motion sensors, whether 2-d or 3-d, such as including the Microsoft Kinect system. 'Internal Data' consists of data related primarily to game operations. 'External' Data sources to combine with Primary Data Source. These may include 1. Location, 2. Current Activity such as Driving (provided by vehicle, provided by tracked phone) or Exercising (provided by FitBit or similar), 3. Economic Conditions, 4. Weather, 5. Recent Events/News, e.g., a recent Large PowerBall win, 6. Marketing Information, 7. e-mail scans, e.g., Google scanning of Gmail for content, 8. Social Media, and 9. the Internet of Things (IoT). The Internet of Things (IoT) provide various forms of connected devices such as data sensors. The sensors generate data input "stimuli" to system. By utilizing any form of input, the system is able to provide for massive parallelism. All data "stimuli" to system permits the system to be adaptive and reactive to all data stimuli.

An Output provides stimulation to user. Forms may include: 1. images, such on a display, or via a GUI, or VR system, AR system, 2. Thin Client display with remote computing power, 3. Projections and Holograms, 4. sounds, 5. tactile stimuli, 6. olfactory stimuli, or 7. direct electrical stimuli, neural or otherwise.

A Value/Title Transfer Network Element serves to receive and transfer value (money, coins, and other items of value). Value may refer to fungible liquid asset or other store of value. Title generally refers to ownership of real, personal, or virtual property. A detailed discussion of blockchain, trust-less, and cryptocurrency systems is provided, below.

Artificial Intelligence (AI) is broadly that branch of computer science dealing in automating intelligent behavior. They are systems whose objective is to use machines to emulate and simulate human intelligence and corresponding behavior. This may take many forms, including symbolic or symbol manipulation AI. It may address analyzing abstract symbols and/or human readable symbols. It may form abstract connections between data or other information or stimuli. It may form logical conclusions. Artificial intelligence is the intelligence exhibited by machines, programs or software. It is has been defined as the study and design of intelligent agents, in which an intelligent agent is a system that perceives its environment and takes actions that maximize its chances of success. Yet others have defined it as the science and engineering of making intelligent machines.

Artificial Intelligence often involves use of neural networks. In various embodiments, a multi-layer stack of neural network nodes are utilized. The lowest level comprises granular elements. By way of example in a gaming application, in the order of higher level understanding, the levels would progress from instances of individual action (granular), to core loop detection, to session play, to multi-session play. Optionally, a parsing engine serves to break down or subdivide a larger set, such as a data set or image, into more discrete or granular elements.

AI may have various attributes. It may have deduction, reasoning, and problem solving. It may include knowledge representation or learning. Systems may perform natural language processing (communication). Yet others perform perception, motion detection and information manipulation. At higher levels of abstraction, it may result in social intelligence, creativity and general intelligence. Various approaches are employed including cybernetics and brain simulation, symbolic, sub-symbolic, and statistical, as well as integrating the approaches.

Various tools may be employed, either alone or in combinations. They include search and optimization, logic, probabilistic methods for uncertain reasoning, classifiers and statistical learning methods, neural networks, deep feedforward neural networks, deep recurrent neural networks, deep learning, control theory and languages.

AI advantageously utilizes parallel processing and even massively parallel processing in their architectures. Graphics Processing Units (GPUs) provide for parallel processing. Current versions of GPUs are available from various sources, e.g., Nvidia, Nervana Systems.

Machine Learning is defined as a system that builds up knowledge from experience. Machine learning serves to detect patterns and laws.

Deep Learning uses Neural AI. It is easily scalable, and typically involves more layers or neural Networks (NNs). Neural Networks may be of various forms, including: efficient NN, vectorized NN, vectorized logistic regression, vectorized logistic regression gradient output, binary classification, logistic regression, logistic regression cost function, gradient descent, derivatives, computation graph and logistic regression gradient descent.

Deep neural networks (DNN) often involve hyperparameter tuning. Typically they utilize regularization and optimization. Sometimes they are referred to as Deep Belief Network (DBN).

Other forms of neural networks include Convolutional Neural Networks (CNN) or Recurrent Neural Networks (RNN). Examples of available systems include: LSTM, Adam, Caffe, Dropout, Batch Norm, Xavier/He, Python, Scikit-Learn and TensorFlow.

AI may operate on various forms of data sets. The data set may comprise images, whether video images, 2D Data and/or 3D Data. Sequential data may be analyzed. Examples include, but are not limited to, natural language, audio, autonomous driving decisions, game states and game decisions.

Various industry applications advantageously benefit from application of AI. They include imaging and object detecting, serving to identify, classify, mining and optionally provide sentiment analysis. Other applications include autonomous driving. Yet other applications include robots and robotics. Within healthcare, functions include imaging analysis, diagnosing and gamification. Various forms of sequential data analysis may be enhanced, such as speech recognition, and natural language processing. Music applications include both recognition and synthesis. Within the gaming field, applications include game state sequences detection, analysis, formation, combination optimization, and game optimization. Chat bots and machine translation advantageously employ these systems.

Figure 7:
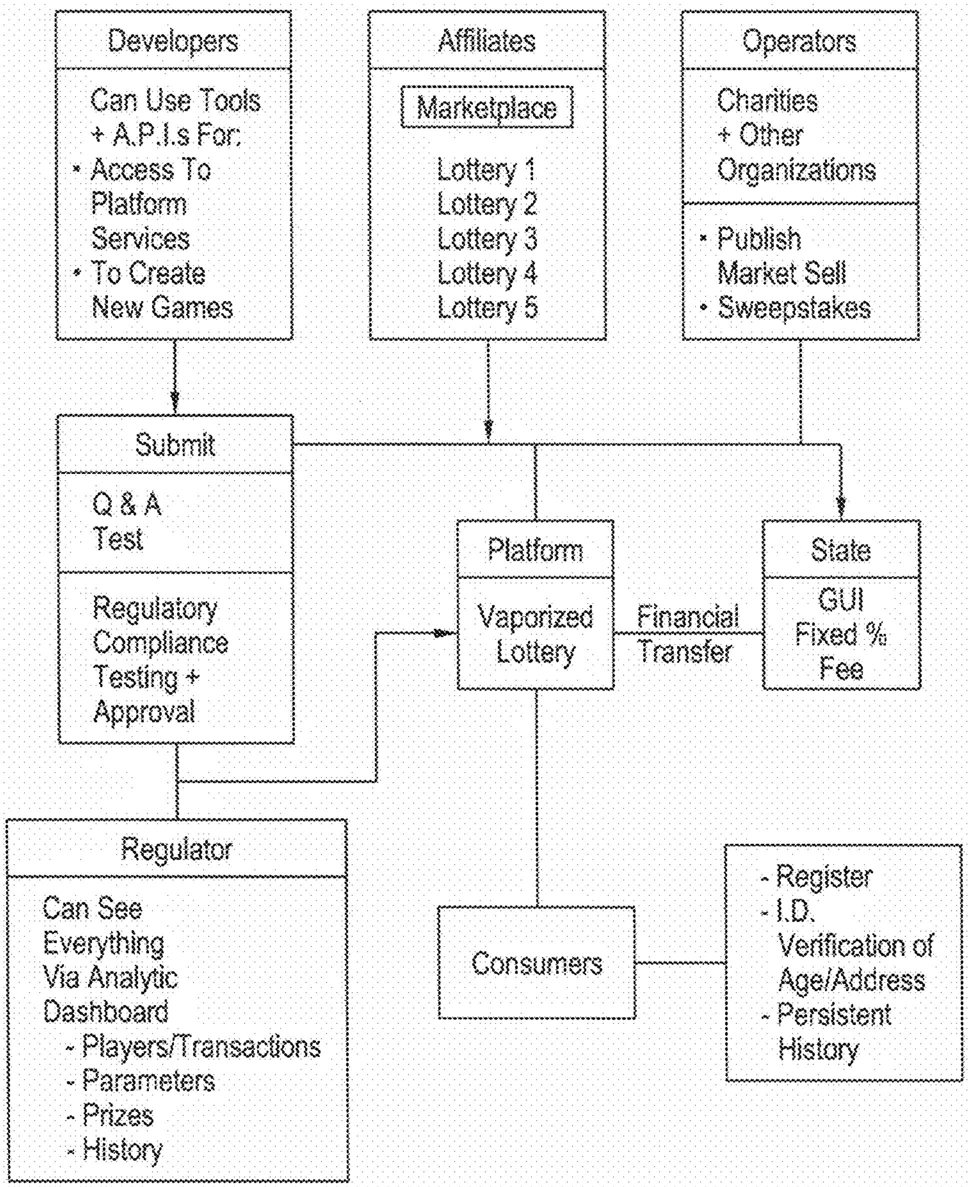
FIG. 7 is a diagrammatic view of the ecosystem, including interfaces and interconnections.

FIG. 7 shows the constituent function blocks within an entertainment or gaming ecosystem. Affiliates serve to acquire customers. Affiliates receive a commission, such as based on the number of users acquired or a percent (%) of revenue. Optionally, there is a link to a credit card function (to be discussed, below in connection with FIG. 30).

Next are charities and other organizations that plan to operate a lottery, game or other entertainment event. They provide for customer acquisitions. They are the recipient of the event (game, lottery or entertainment). They also collect a fee.

Next are the developers, who provide for game design. In return for game design, they receive multi-jurisdictional use and payment for use. An enhanced application or app store may be provided wherein the game design may be viewed, selected and downloaded.

Next, consumers provide registration and identification information. The registration data may optionally include identification, age, address and verification. Optionally, the data is sufficient that the system can comply with Know Your Customer (KYC) rules, with optional levels of identity verification. This is stored as persistent history. The customer receives a chance to play, win, and receive entertainment.

Next is the regulator or trust verifying agent. They provide testing, approval for game fairness, overall approval, ensure compliance with regulations and security. The regulator or trust verifying agent is granted access permission by the system to monitoring of every transaction, (analytics dashboard), player accounts, parameters, prize amounts and payouts, and to the complete history. The regulator or trust verifying agent receives compensation, whether a fee or as a percentage of the transaction amounts.

Next, the lotteries serve as the trusted agent, and receive a percentage of the transaction amount. Optionally, the historical functions of the lottery may be eliminated or vaporized from the system when those functions are performed by another entity within the ecosystem.

Figure 8:
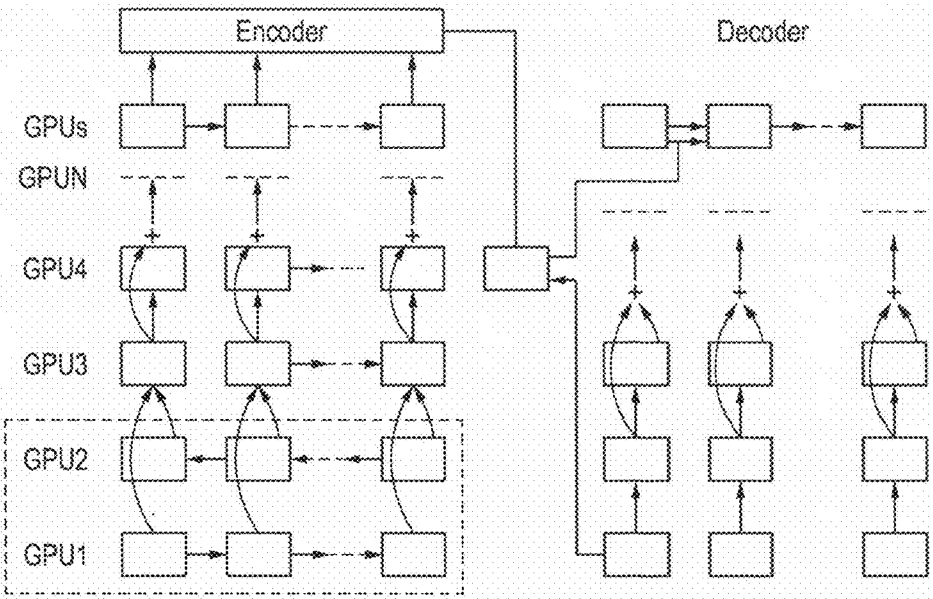
FIG. 8 is a system level block diagram of the neural network model architecture including graphical processing units (GPUs).
Figure 9:
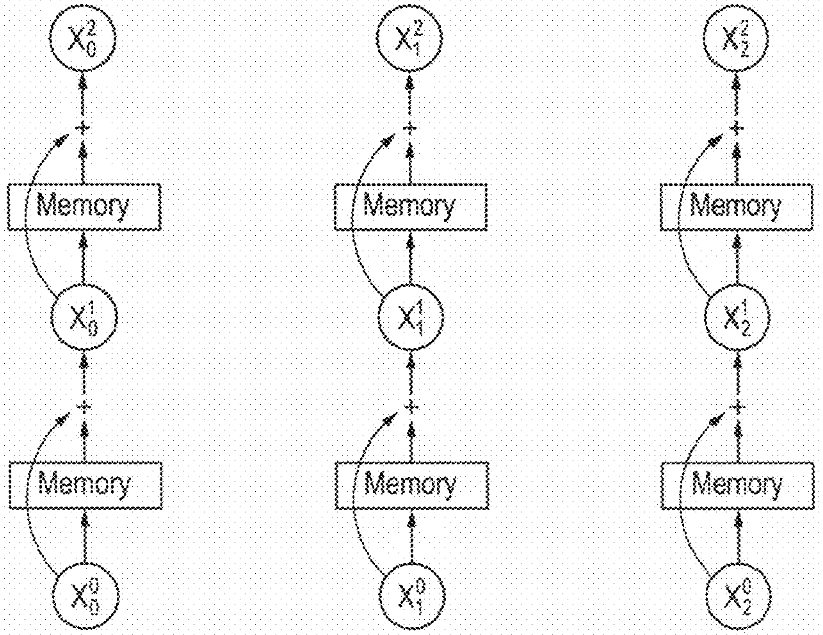
FIG. 9 is a system level block diagram of the neural network model architecture.

FIGS. 8 and 9 relate to the learning processes for training neural networks. By providing repeated input stimulus and then training the neural network to provide the correct output, the system may be taught to form the correct associated output based on one or more input stimului. In converting input to the desired output the training may comprise supervised learning, such as when the target values and parameters are supervised. Alternatively, the training may be non-supervised learning, wherein the system attempts to identify patterns in the input that have identifiable structure and can be reproduced. Alternately, the system may use reinforcement learning, which works independently (like non-supervised learning) but is rewarded or punished depending on success or failure. Preferably, reinforcement learning involves incremental change. In the various training techniques, perturbation may be used wherein one or more input parameters are varied, typically in a perturbation amount, e.g., less than 10%, more preferably less than 5%, and most preferably less than 3%, of the input value, so as to monitor the effect of the perturbation on the output.

Hyperparameters and parameters may be used in the AI or machine learning systems. Model parameters are estimated from data automatically. A configuration variable internal to the model can be estimated from data. This can be required by the model when making predictions. Values define the skill of the model. They may be estimated or learned from data.

Hyperparameters are set manually and are used in the processes to help estimate parameters. A configuration variable external to the model is used. Generally, it cannot be estimated from the data. They are often used in processes to estimate model parameters. They are typically specified by the system user. Hyperparameters can often be set using heuristics. They are often tuned for a given predictive modeling problem. A hyperledger may be used, either as a hyperledger composer or hyperledger fabric.

The AI or machine learning may be performed on various types of hardware. Advantageously, systems that support parallel processing can provide for computation speed and efficiency. Parallel processing units such as Graphics Processing Units (GPUs) are available from NVIDIA and AMD. Neural Processing Units (NPUs) are available in the Kirin 970, Apple A11 and the Qualcomm Zeroth Processor. AI and machine learning processing is also available as a cloud AI or Machine learning system, such as is available from Google and Amazon Web Services.

Figure 10:
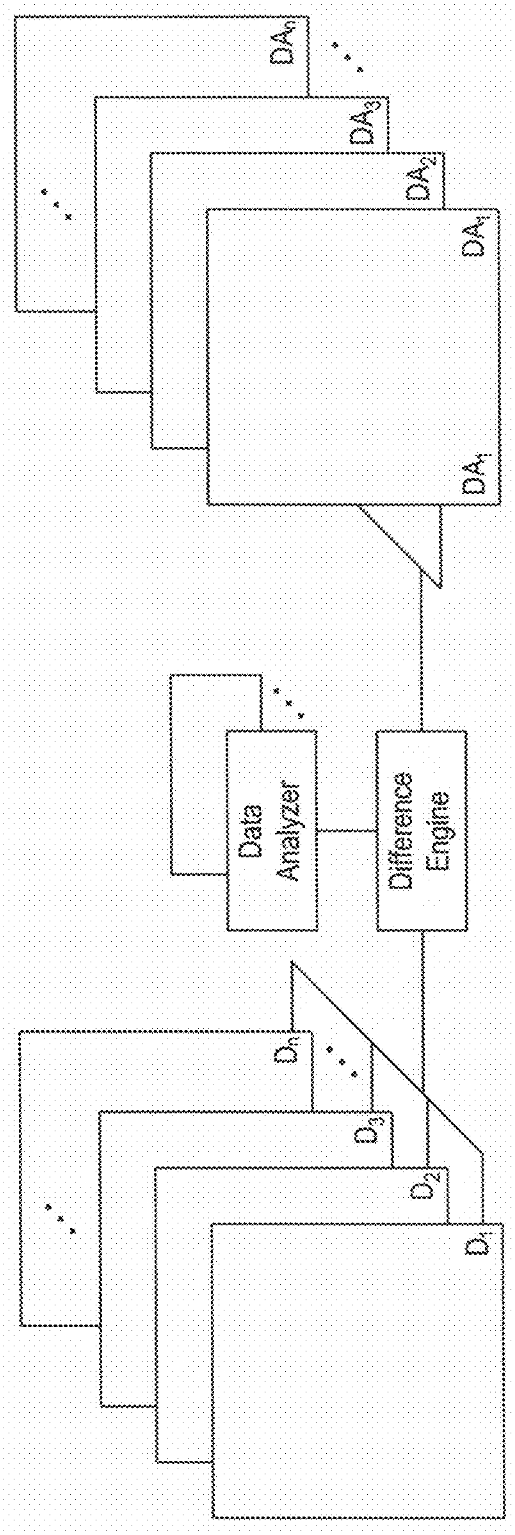
FIG. 10 is a system level diagram of multiple data sets including a difference engine and data analyzer.

FIG. 10 describes domain transformations and difference engines. One advantageous domain transformation involves the time domain to frequency domain (time series to frequency domain). One example is the Fourier series, which generally is used with repetitive signals, such as oscillating systems. A Fourier transform, is generally used with non-repetitive signals, such as transients. Enhanced computational techniques such as the Fast Fourier Transform (FFT) may be used for efficiency and computational speed. Yet another domain transformation is the Laplace transform, often used in electronic circuits and control systems. Yet another, the Z transform, is used with generally discrete-time signals. Digital Signal Processors (DSPs) may be advantageously utilized. Spectral density estimation may be included, along with wavelet analysis, image analysis, data compression and multivariate analysis. Correlated data sets are advantageously employed.

Difference engine may be employed to identify differences between two or more sets of data. The difference may be time based, such as where one data set relates to a time 0, and the other set relates to a time 1, time 2, time 3, . . . , time N. Differences in images may be calculated.

Figure 11:
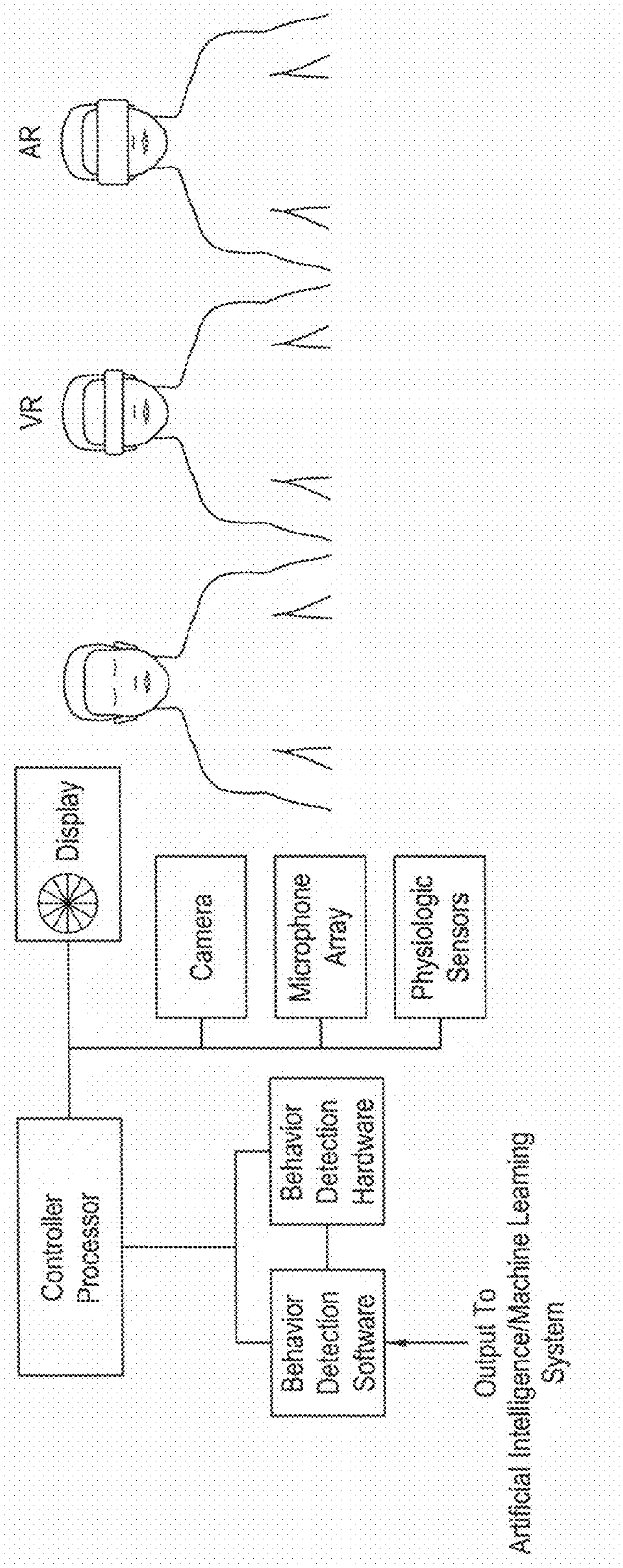
FIG. 11 is response system display and detection system for generating input to train the artificial intelligence (AI) and machine learning (ML) systems.

FIG. 11 shows a system in which the Subject response may be monitored, captured and analyzed for behavior, which is then used as input to AI. In various efforts, such as in game or entertainment design and creation, the response of the target audience may be monitored, analyzed and used to train an Artificial Intelligence or machine learning system.

The subject response to entertainment/game stimuli serves to measure the 'fun' experienced by the subject, and that measure (the 'fun') is then used as a training input to AI or ML system. The system may detect individual subject behavior. Alternatively, the system may monitor group behavior, serving to detect the 'fun' experiences, but may also measure attributes of the group or crowd, such as 'excitement', 'engagement' or crowd based behavior.

A display is provided as a stimulus to the subject or subjects. A flat panel display or monitor may be utilized. Optionally, personal viewing devices may be utilized, such as individual screens, virtual reality headsets, augmented reality devices, heads up displays, projection devices or imaging technology.

Various detectors are utilized to monitor the one or more subject's response. Motion detection utilizes motion tracking hardware and software. A camera images the subjects. Various cameras include the Microsoft Kinect, 2d sensors and cameras and 3d sensors and cameras. Metrics detectors may analyze the position of a body part, such as a limb, joint or facial feature. It may measure the velocity, movement, higher level derivatives of the position or movement, such as the rate of change of change. Facial detectors monitor for facial recognition. Facial attributes may be detected, such as positive attributes, e.g., a smile, or negative attributes, e.g., a frown. Body position detection may be determined. Sound detection may be performed with a microphone or microphone array. It may detect attributes of the sound, such as positive attributes, e.g., a cheer, and negative attributes, e.g., expletives, and boos. Biometric scan detection is utilized. Physiologic response detection optionally monitors the subject heart rate, blood pressure, pupil dilation, temperature, ECG, and mental activity. Activity monitoring detectors monitor engagement response, preferably including bet rate, time spent engaged with the display, retention rate, repetition rate and reengagement rate. Analytics are advantageously utilized.

The output of the system is used as input in the AI or machine learning system. For example, in training using reinforcement learning in neural networks, a positive weighting is used for positive attributes, and a negative weighting is used for negative attributes.

The system may additionally provide output identified as associated with addiction, such as gambling addiction, or a subject otherwise being 'hooked' on the game. When the level of engagement or minor addiction is viewed as acceptable, a positive weighting may be used in the training, whereas when the addiction is viewed as unacceptable or excessive, a negative weighting may be used in the training.

The artificial intelligence, machine learning, neural network, use of user response in training AI/ML systems (generally FIG. 11 and discussion, above), may advantageously be utilized in game design and develop, entertainment development and/or any creative developmental effort.

The systems may constitute a matrix of tools. They may comprise a given set of tools. In a more fundamental way, they comprise a tool to discover the tools. Tools may be game states, entertainment states or any form of state or matter.

The following will be described as to game development, but the tools, systems, methods and architectures may be applied to entertainment or any creative effort. As to a particular game, a first option is to provide only basic rules of that given game. The system may play against itself, or alternatively, play against other systems, in order to discovery winning game play strategies. In yet another option, the system may be provided with known gambits, with the system permitted to use or ignore the gambits. In yet an alternative embodiment, the system may be provided with a library of games. The system may analyze the library of games for game elements, game mechanics or core loops. Optionally, the system may limit analysis of the library of games to similar games, or may consider all games, optionally divided into subunits, e.g. card games, board games, video games. Once the various core loops or game elements are defined, the system may combine them in various combinations and permutations so as to define a new game or game play sequence. The system may recognize patterns in the data. Values may be assigned to decisions at various points or game states or game state decision points. The use of user response may be advantageously used in game formation and optimization. The use of user response is particularly suited to reinforced learning.

The system may operate in a hierarchical manner. Hierarchical systems may be used, where it may vary a 'subservient' mandated parameter so long as 'superior' or 'master' mandated parameter is met. By way of example, a 'super' mandated parameter' may be used to guarantee a particular outcome. Alternatively, an administrative control may be granted, such as to set a 'top level' constraint.

The system may consider separate functions in a cooperative action. Functions may be reassigned or moved to other, especially lower, levels of action. The system may provide new variables. By providing a hierarchical response, core functionality may be maintained. Optionally, the system may employ a "kill switch" for the system, an apoptosis, such as based on a command such as from an administrator, or based on predefined criteria. The system may provide a package of experience ('Total Recall') such as in a continuous state and/or persistent state.

Figure 12:
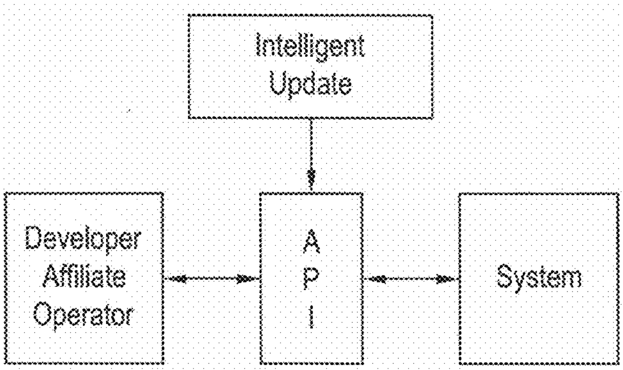
FIG. 12 is a system level diagram of a dynamic system application programing interface (d-API).
Figure 13:
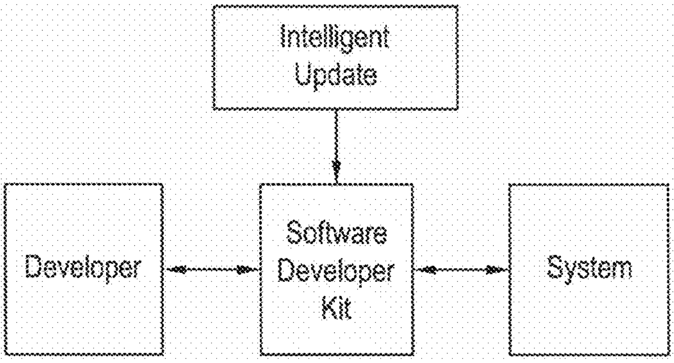
FIG. 13 is a system level diagram of a dynamic software development kit (d-SDK).
Figure 14:
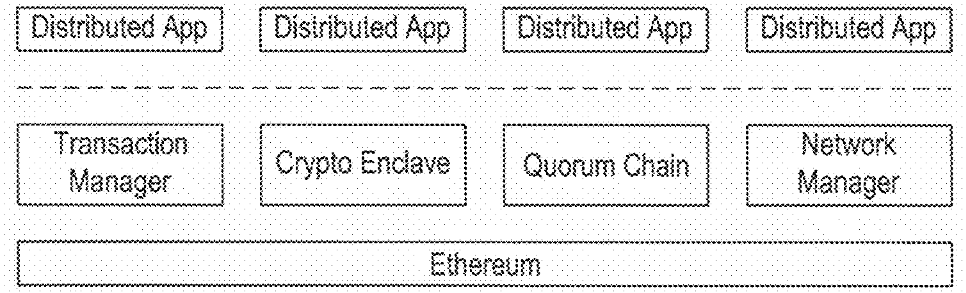
FIG. 14 is a system architecture level diagram of a distributed system including blockchain and Etherium.
Figure 15:
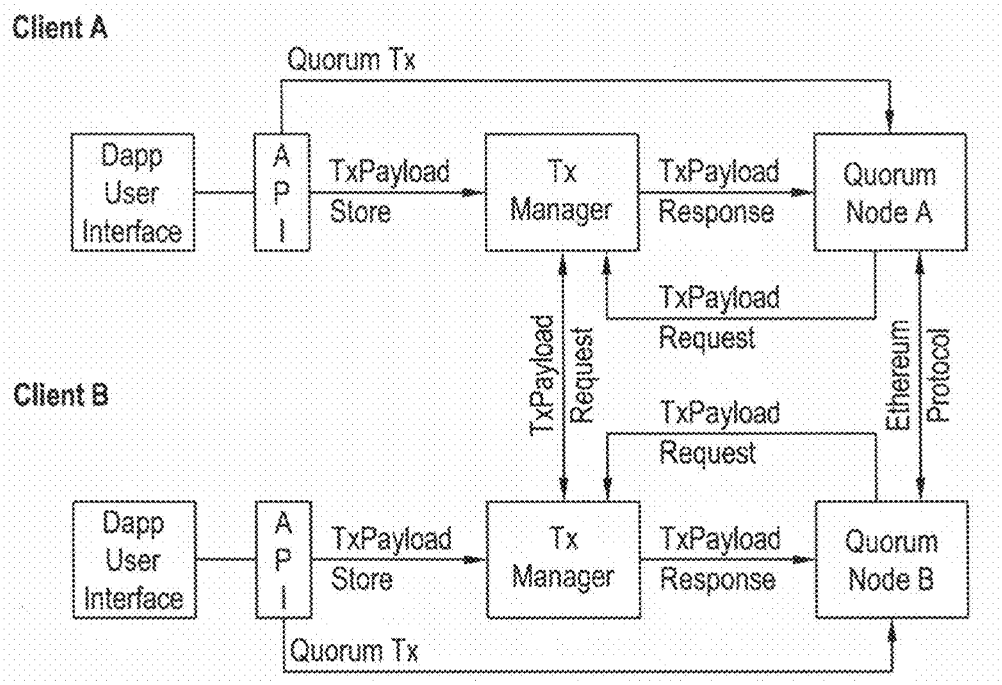
FIG. 15 is a system architecture level diagram of a permissioned blockchain system.
Figure 16:
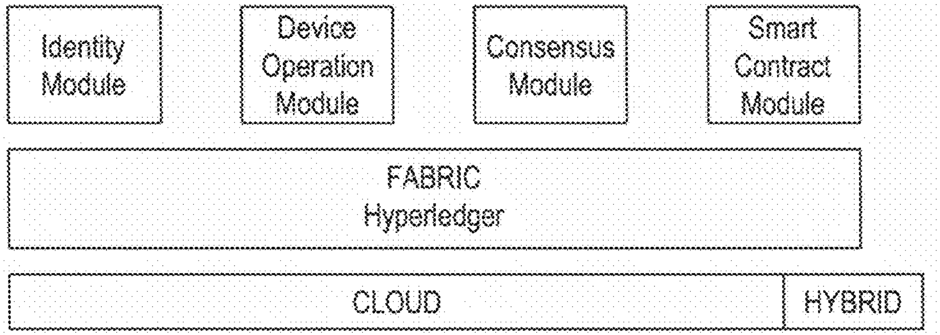
FIG. 16 is a system architecture level diagram of a blockchain platform.
Figure 17:
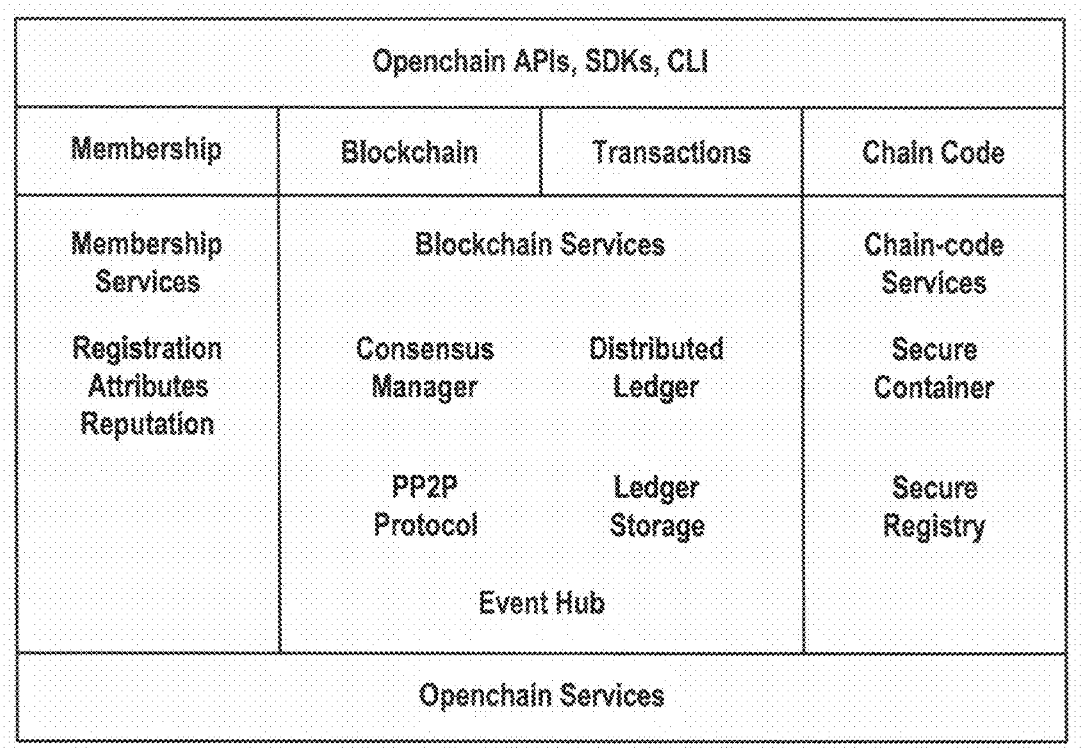
FIG. 17 is a system architecture level diagram of a blockchain platform including open chain services.
Figure 18:
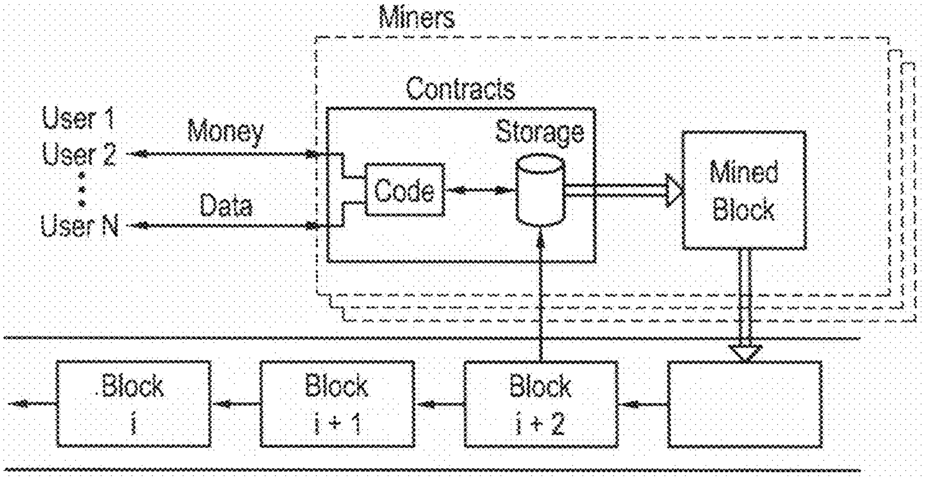
FIG. 18 is a system architecture level diagram of a decentralized cryptocurrency system with smart contracts.
Figure 19:
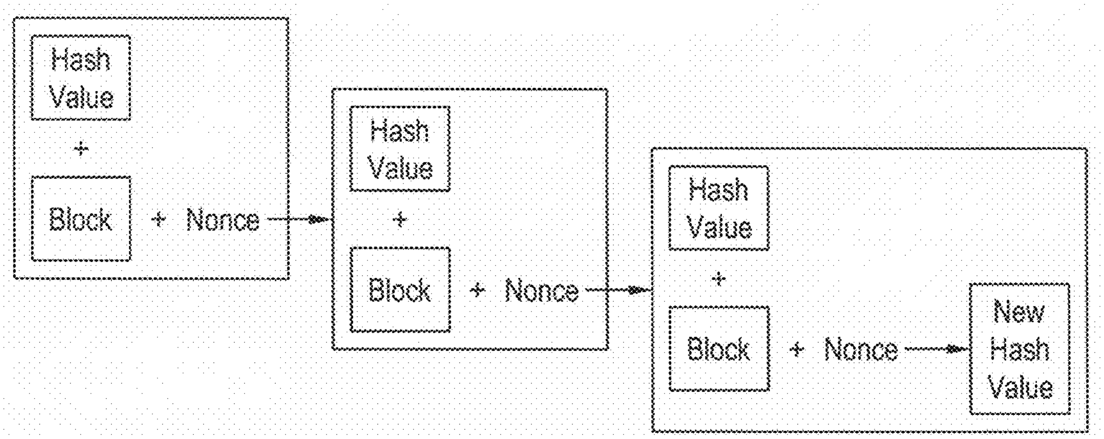
FIG. 19 is a system architecture level diagram of a decentralized system with sequential hash value creation.

FIGS. 12 & 13 relate to various dynamic, that is changeable, systems. In the designation "d-API" and "d-SDK", 'd' stands for 'dynamic' and is capable of change within and by the system. The format of the interaction (request and/or response) may be changes. Alternately, it may change the type, quantity or quality of information provided in the response. Other factors that may be changed include the ability of the request to alter the information via the API or SDK. Changes may be made to other operational or administrative rights or permissions, such as read only access, read and write, edit rights, super administrative rights. These provide for dynamic change under adaptive control.

Within the dynamic-Application Programming Interface (d-API), an initial format for request and response is defined. This may be considered in an 'if-then' statement: IF you ask for X in an agreed upon format, THEN system will provide X. The dynamic system may vary the format, and/or response. An intelligent dynamic update may be based on AI, machine learning or analytics. While not limited to the following, some or all of these changes may be implemented dynamically: the format of the interaction (request and/or response), access to more information or functionality, e.g. read only, or modification rights, the ability to provide information or data to the system, and the ability to change data.

Within the dynamic Game Development Kit (d-GDK), an initial kit is provided. The system then permits dynamic modification of the GDK. Preferably, dynamic modification is based on AI or Machine Learning or analytics.

Dynamic Segregated Lottery (d-SL) may be provided wherein one or more functional units or the lottery may be provided. A virtualized system may be utilized, such as in the use of a virtualized server.

FIGS. 14-20 relate to a blockchain implementation for games, entertainment or other useful ends. Blockchain uses a cryptographic 'hash' to identifies each block and transaction. Each successive block contains a hash of the previous code. This permanently fixes transactions in chronological order. The blockchain utilizes both a private key and public key. The prior hash is added to the new blockchain with a nonce to form a new hash.

Cryptocurrency provides for cryptographically secure transactions. Cryptocurrency is a programmable currency or decentralized value transfer system. It is also a decentralized virtual currency or decentralized digital currency.

Proof of work, or proof of stake, is the "right" to participate in the blockchain. It must be onerous enough to prevent changes without redoing the work. Bitcoin is a created currency which is mined and serves as a reward for payment processing work. Blockchain cryptocurrency involves no transaction charges or fees paid by purchaser. There are no refund rights or chargebacks.

It may be implemented in any form of network, both public and private. Open software and proprietary software may be used. Storage may be local storage or cloud storage and computing. Analytics may be performed locally or in a cloud analytics system. Analytics As A Service (AAAS) may be performed. Systems may be permissioned v. permission less distributed systems.

Figure 21:
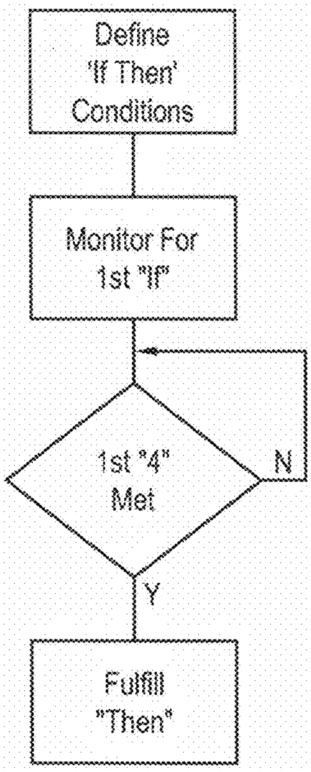
FIG. 21 is a flowchart diagram of a smart contract.
Figure 22:
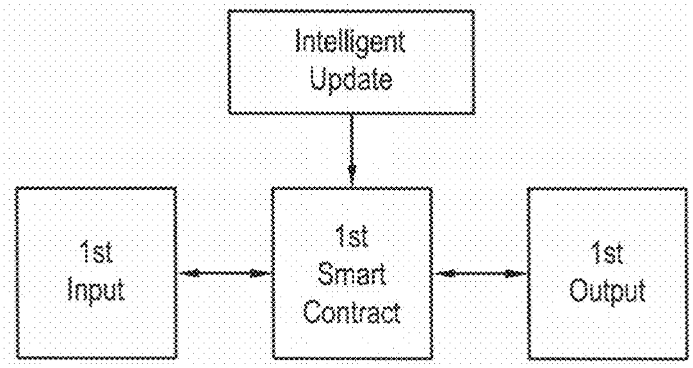
FIG. 22 is a flowchart diagram of a smart-smart (smart$^2$) contract.
Figure 23:
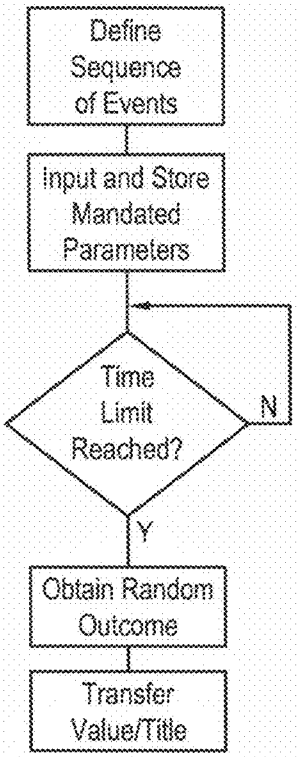
FIG. 23 is a flowchart diagram of a smart contract having mandated and variable parameters.

FIGS. 21 through 23 relate to smart contracts. The core elements are, first, a set of promises which may be contractual or non-contractual. Second, they are specified in digital form, operate electronically, where the contractual clauses or functional outcomes embedded in code. Third, they include protocols, or technology enabled rules-based operations. Fourth, the parties perform on the promises through automated performance, in a generally irrevocable manner.

Smart contracts automate different processes and operations. In one embodiment, they automate "if-this-then-that" on self-executing basis with finality. They may provide for payments. Actions may be conditioned on a payment or payments, such as with the control of collateral based on payment.

Smart contracts may be implemented via blockchain. This forms a trusted system, which may be implemented in a business to business implementation (B to B) and/or peer-to-peer implementation. The machine-to-machine implementation permits various combinations. In one implementation, a blockchain is combined with devices comprising the Internet of Things (IoT). In yet another combination, the blockchain may be combined with devices comprising the Internet of Things in combination with artificial intelligence. Generally, the block contains smart contract program logic. It bundles together the messages relating to a particular smart contract including inputs, outputs, and logic. In yet another implementation, they may provide contracts for difference, such as in use the current market price to adjust balances and disperse cash flow.

Smart contracts are a trust shifting technology. They reduce counter-party risk. Preferably, this serves to increase credit.

Smart contracts may be implemented in various models. They may be a contract entirely in code. They may be a contract in code with separate natural language version. They may be split natural language contract with encoded performance. Alternatively, they may be a natural language contract with encoded payment mechanism.

Smart contract initiation involves a consensus. An algorithm constitutes a set of rules for how each participant in the contract processes messages. They may be implemented in a permission-less manner, wherein anyone may submit messages for processing. The submitter may be involved in consensus. Alternately, they may delegate decision making such as to an administrator or sub-group of participants. An alternative implementation is to have a permissioned system, in which the participants are limited. They are generally pre-selected. They are then subject to gated entry and be subject to the satisfaction of certain requirements and/or approval of an administrator.

Smart contracts are subject to various methods of formation. They may by agreement such as where there is a common cooperative opportunity or a defined desired outcome. These may include business practices, asset swaps, and transfer of rights. Next, conditions set for initiation of the contract. That may be by the parties themselves, or by the occurrence of some external event, such as time, other quantifiable measure or location. Typically, they generate a code, which is encrypted and chained with blockchain technology. It may be authenticated and verified. Upon execution and processing, the network updates all ledgers to indicate current state. Once verified and posted, they cannot be changed, with only additional blocks appended.

To restate, the smart contract serves as a distributed application on networks with independent built-in trust mechanisms. The program is entrusted with the unit of value combined with rules for transfer of ownership of the unit of value. They serve as self-executing programs that automatically fulfill the terms of a programmed relationship.

Figure 20:
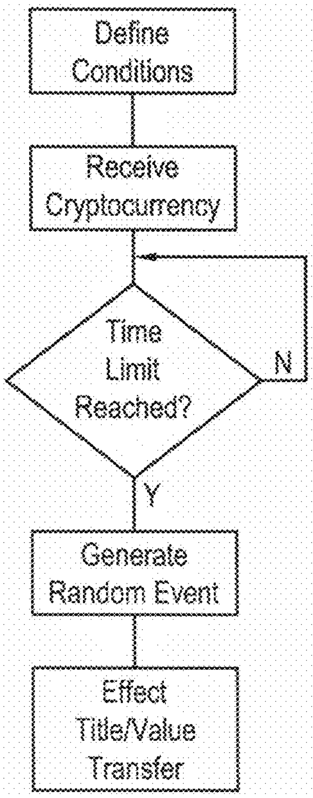
FIG. 20 is a flowchart diagram of a cryptocurrency lottery.

FIG. 20 shows a Lottery embodiment implemented as a smart contract. The method for implementing a lottery includes the following steps. A time frame is set in which to receive cryptocurrency. Second, cryptocurrency is received with owner identification within the timeframe. The window opens for a specified duration, afterwards at which the window closes. The smart contract generates or receives a random event, such as from a random number generator. The random number generator should include an algorithmic guarantee of randomness and a guarantee of no hack. The contract selects a new owner (winner) among the owner identification related cryptocurrencies. It then assigns new ownership of cryptocurrency to selected new owner (winner).

Smart contracts may be used to implement a core loop or a game mechanic. The following core loops and game mechanics comprise a partial list of those that may be implemented, including but not limited to JACKO, POKO, Hot Seat, Hi Lo, Rock, Paper Scissors, In the Zone and iLotto or other array or geography based game mechanics or core loops. Any subunit of the game mechanic or core loop may itself be used as a game mechanic or core loop.

Jacko is a game comprising the steps of: randomly selecting a target number from a first range of numbers having a minimum and maximum number, presenting an indication of the target number to the player, selecting a number for the player, the number being selected from a second range, having a minimum and maximum, where the maximum is equal to or less than ½ of the minimum of the first range, receiving an indication from the player whether to draw again, and if so, randomly selecting a number from the second range, accumulating the total of the player's draws, and repeating this step until either the player declines to draw or the total exceeds the target number, and in the event the player declines to draw, randomly selecting numbers from the second range, accumulating those numbers, comparing them to the player's accumulated amount, and assigning as to the winner whomever has a total closest to, but not exceeding, the target.

Poko is a multi-player game where multiple indicia are awarded a predefined value, where other players have no information as to at least some of the indicia held by other players.

High Lo is a game comprising the steps of: performing a first lottery selection of a series of randomly drawn numbers, receiving from a player an indication whether the next randomly drawn number will be higher or lower than the preceding number, and if correct, awarding winnings correlated to the amount of the randomly drawn number, and continuing until the player fails to predict the high/low outcome, or elects to stop.

In the Zone is a game of chance comprising the steps of randomly selecting a player's target number within a predefined range of numbers, the range having a minimum and a maximum, randomly selecting a series of numbers for use in a lottery game, the minimum of the predefined range of numbers being at least equal to the sum of the lowest possible total for the series of the lowest possible total for the series of numbers and the maximum of the predefined range of numbers, totaling the random selected series of numbers through the conclusion of the selection, and assigning prize amounts to players having a player's number not exceeding the total based upon the proximity of the player's number and the total number.

Rock Paper Scissors is a game with three or more options having an assigned priority of options relative to one another.

Hot Seat is a game of increasing risk/reward including the ability to 'opt out' in Smart Contract. A method for game play in a multi-level game of chance culminating in a final level, comprises the steps of presenting, at a given level, a plurality of random options wherein at least one option is a positive option, another option is a negative option, and a third option requiring a further decision, receiving a selection regarding which one of the plurality of random option is selected, and if the positive option was selected, cumulating the positive option result with the prior positive option results, but if the negative option was selected, cumulating the negative option result, comparing the cumulative result with a predetermined number, and replaying the same level if the cumulative number is less than the predetermined number or terminating the game if the cumulative number equals the predetermined number, and if the third option was selected, receiving a selection regarding the decision, respecting the above steps until the player stops, the predetermined number of negative events occurring or the final level is related.

iLotto is a grid or geography based system including a display for presenting a grid of identifying objects, an input for receiving a player selection of an identifying object, a random generator for randomly selecting a winning identifying object, and a point tally system for awarding points to the player according to the rules comprising a first point value if the player selected identifying object exactly matches the winning identifying object, a second point value if the player selected identifying object is in a geometric relationship with the winning identifying object, and a third, negative, point value if the player is not awarded the first point value or the second point value.

FIG. 23 relates to implementation of mandated and variable parameters. Mandated parameters are set in smart contracts. Examples of mandated parameters include payout percentage and payout amount. Variable parameters are subject to mandated parameters, providing entertainment options.

Figure 24:
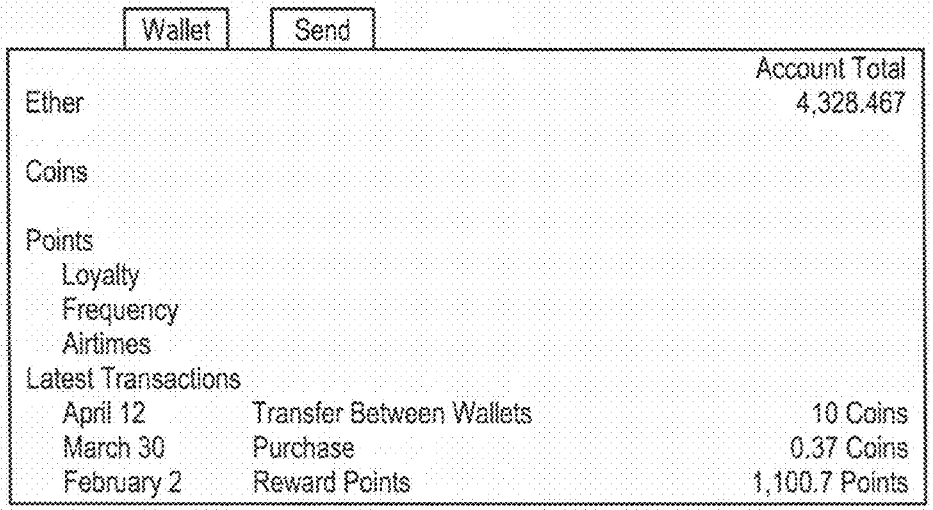
FIG. 24 is a graphical user interface (GUI) of a cryptocurrency wallet.

FIG. 24 depicts a wallet serving for the electronic storage of cryptocurrency. This represents a graphical user interface ("GUI"), such as on a phone or computer display. Various forms of cryptocurrency may be displayed on the GUI and stored in the wallet. Points may be awarded, such as for loyalty, frequency and airtimes. Recent or latest transactions may be listed, indicating the date, purpose and amount. A total account value may be shown.

Cryptocurrency systems and smart contracts may be implemented in combination with other systems. One additional system comprises a frequent user or player's club system. They may be combined with other forms of 'currency lite', including micro-transactions and micro-payments. They may be used in combinations with smart properties, that is digital assets or physical things that know who their owner is. Digital assets are anything that exists in digital, typically binary, format and comes with the right to use. Examples include images, including still pictures and video or dynamic images, audible content, such as sounds, music or performances, and digital documents. Property whose ownership is controlled via distributed trusted network, e.g., blockchain using contracts. They may be further used in combination with geolocation, wherein the physical location (geolocation) of various components and architectural components are optionally a component of the system. Limits may be placed on the geography of game play. The system can ensure compliance with geolocation of data routing.

Figure 25:
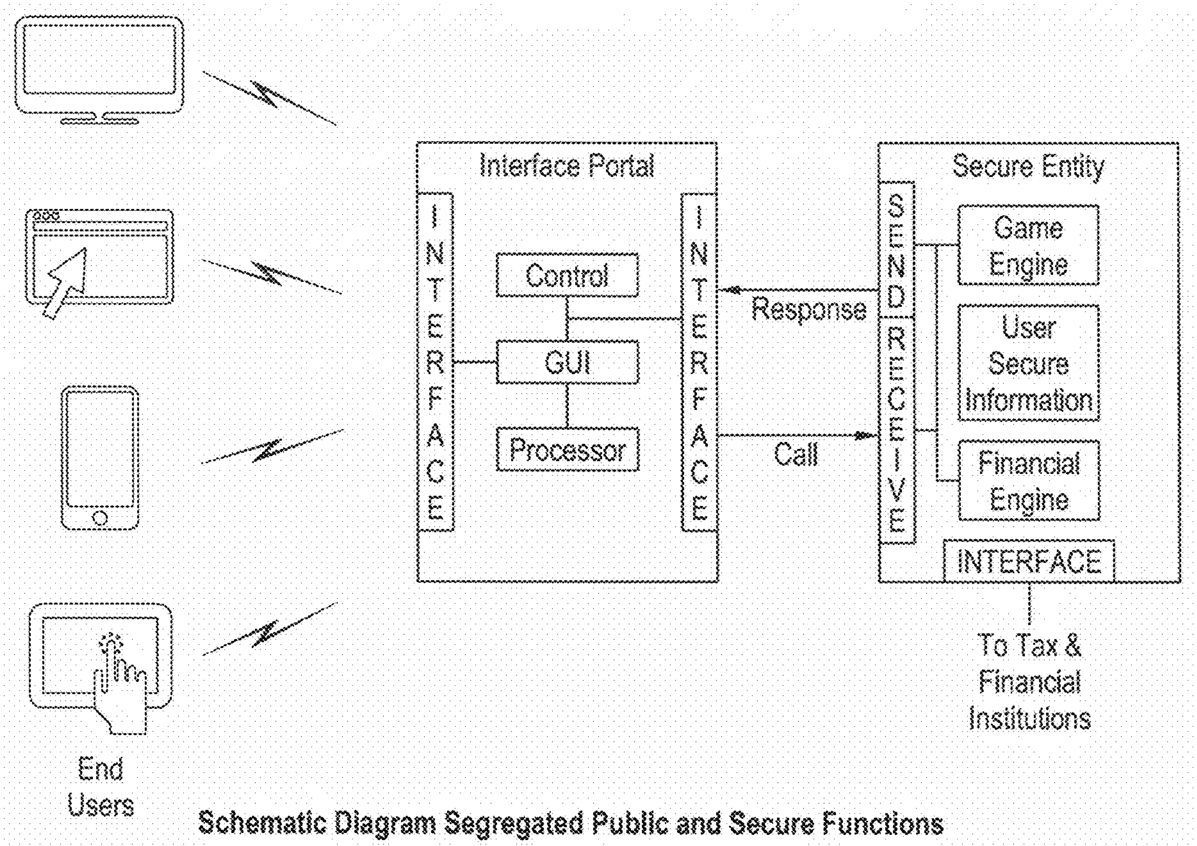
FIG. 25 is a system architecture level schematic diagram of a system having segregated public and secure functions.
Figure 26:
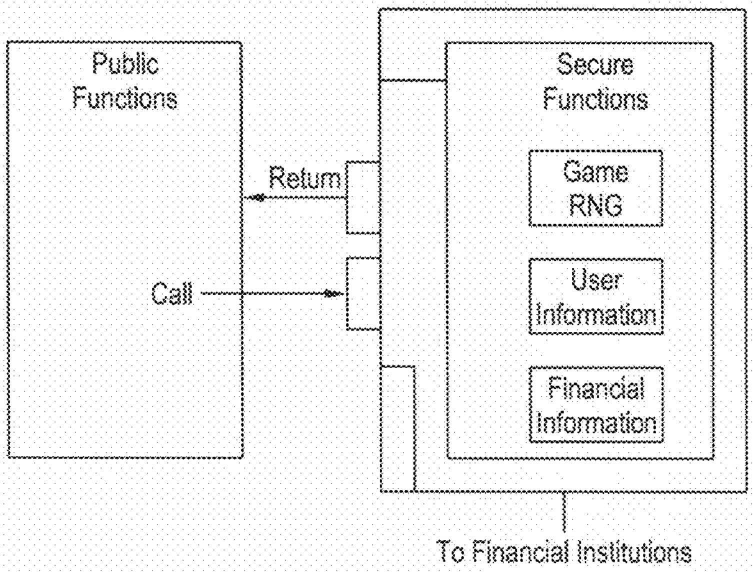
FIG. 26 is a system architecture level of an interface of segregated public and secure functions.
Figure 27:
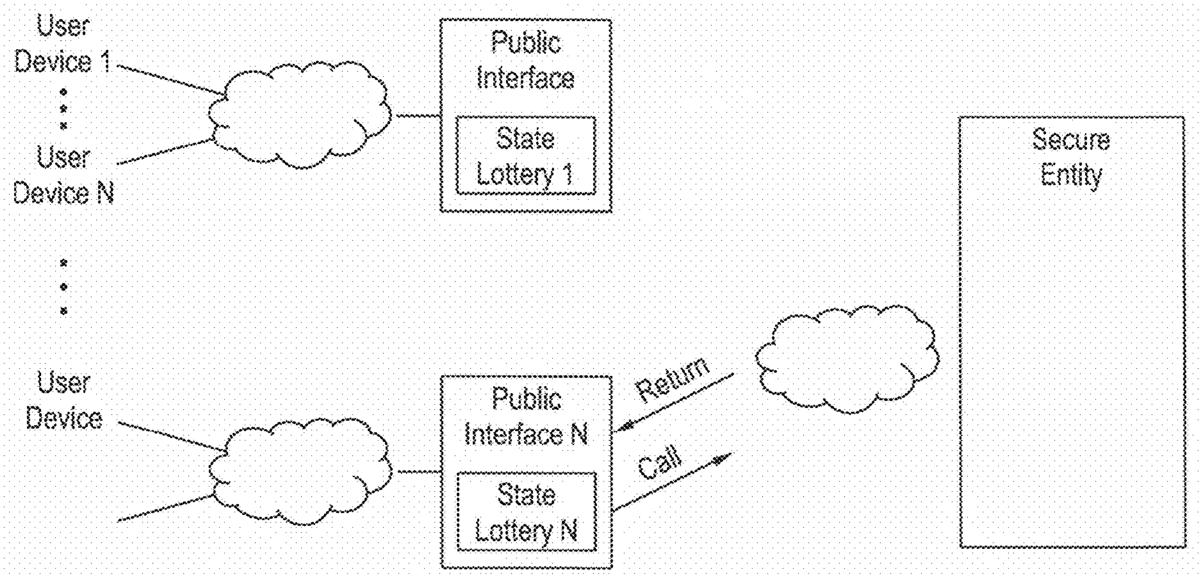
FIG. 27 is a system architecture level of a network implementation of a system having segregated public and secure functions.

FIGS. 25 through 27 relate to systems having segregated secure functions and public functions. This provides a secure platform with multiple interfaces to public functions and public entities. The segregated secure functions provide the function of the trusted agent. The secure functions include one or more of the following. First, outcome determination. This may include the use of a random number generator (RNG) or probability engine. Second, user or player account information is stored. Third, monetary accounting or transactions are stored. Fourth, regulatory and compliance interface is performed. Fifth, interfaces such as a developer interface. Sixth, regulatory functions including Q&A testing, compliance, testing and approval may be provided.

The public functions include some or all of the following. First, the public system issues a 'call' to the secure system. A 'call' may be via an Application Programming Interface (API) or d-API. The "OPEN" system call makes calls to secure system for secure data. Second, a designer interface serves to access tools, APIs, a Development Kit (DK), and a Software Development Kit (SDK). Third, a marketplace interface serves as a lottery interface and optionally an application or app store. Fourth, an operator interface serves to interface with an operator or organizer, e.g., a charity. It preferably serves to publish, market, and sell. Fifth, the user interface permits registration, play activity and persistent history.

The system components may vary by function. Public interfaces and functions preferably comprise an "open" platform. This allows for arbitration and agreement with the secure entity regarding game operations to be performed by the secure entity, e.g., payout %, vGLEPs, who may play, and geolocation. The secure entity performs secure functions including game outcomes, financial matters and secure user data. The end users utilize a "channel mix", including but not limited to web, mobile app, mobile web, tablet, computer, display enabled Devices (wireless), touch screen equipment at retailer, e.g., countertop games. The private entity may impose rate limits and impose responsible gaming controls.

Figure 28:
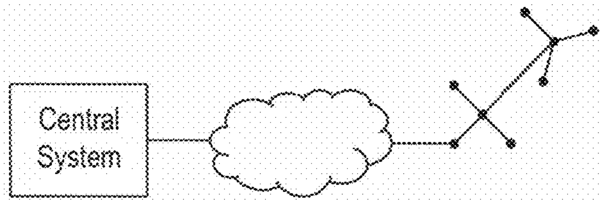
FIG. 28 is a system architecture level of a combined centralized and decentralized system.
Figure 29:
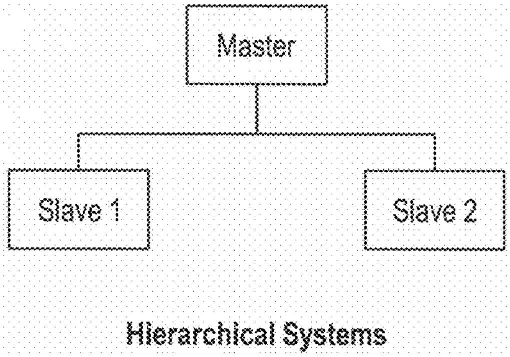
FIG. 29 is a system architecture level of a hierarchical system.

FIGS. 28 and 29 describe hybrid and hierarchical systems. A centralized system, such as a state run lottery may be combined with a decentralized system, such as a blockchain implementation. Hierarchical order may be imposed within the system. In a system using mandated and variable parameters, a hierarchy of mandated parameters may be established, and then various variable parameters may be subject to the appropriate mandated parameter. In another application, a global use rate limit may be imposed at a high level in the hierarchy. Hierarchical use rate limits may be imposed. Various topologies of systems include master slave, master over multiple slaves and circular systems.

Figure 30:
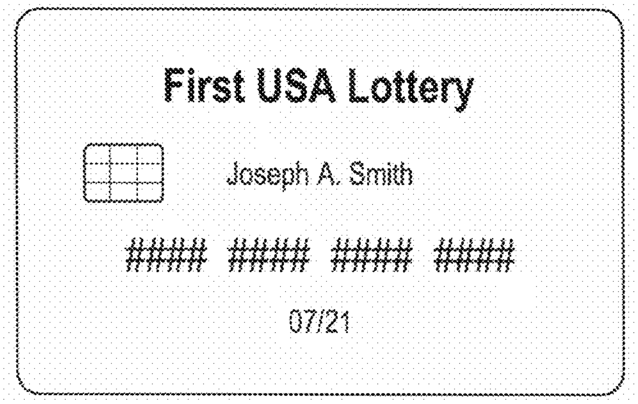
FIG. 30 is a plan view of a lottery linked credit card.

FIG. 30 relates to a game or lottery linked credit card and credit card function. A credit card and credit functionality may be linked to lottery or other game play. Through use of the credit card, a conversion rate is established. By way of example, for every $100 of purchases, $1 in lottery play is made. The rate may be variable, such as based upon institution. In the event a charitable organization organized or sponsored the lottery or game, every $100 of purchases accrues $2 for the organization. A split may also be performed, such as for every $100 of purchases accrues $1 in the lottery or game for the credit card owner and $1 for the organization.

In alternative embodiments, the mobile gaming device may be connected to the gaming machine with a cable, either directly connected to a port of the gaming machine or via a network communicating with the gaming machine.

The software used to program the gaming machines and servers in accordance with the embodiments described herein may be initially stored on a ROM, such as a CD or an electronic memory device. Such CDs and devices are non-transitory computer readable mediums having the appropriate computer instructions stored thereon. The programming may also be downloaded to the gaming machines via the casino's network.

It should be appreciated that the terminals, processors, or computers described herein may be embodied in any of a number of forms, such as a rack-mounted computer, a desktop computer, a laptop computer, or a tablet computer. Additionally, a computer may be embedded in a device perhaps not generally regarded as a computer but with suitable processing capabilities, including an electronic gaming machine, a Web TV, a Personal Digital Assistant (PDA), a smart phone or any other suitable portable or fixed electronic devices.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible formats.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks. As used herein, the term "online" refers to such networked systems, including computers networked using, e.g., dedicated lines, telephone lines, cable or ISDN lines as well as wireless transmissions. Online systems include remote computers using, e.g., a local area network (LAN), a wide area network (WAN), the Internet, as well as various combinations of the foregoing. Suitable user devices may connect to a network for instance, any computing device that is capable of communicating over a network, such as a desktop, laptop or notebook computer, a mobile station or terminal, an entertainment appliance, a set-top box in communication with a display device, a wireless device such as a phone or smartphone, a game console, etc. The term "online gaming" refers to those systems and methods that make use of such a network to allow a game player to make use of and engage in gaming activity through networked, or online systems, both remote and local. For instance, "online gaming" includes gaming activity that is made available through a website on the Internet.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, embodiments may provide a tangible, non-transitory computer readable storage medium (or multiple computer readable storage media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other non-transitory, tangible computer-readable storage media) encoded with one or more programs that, when executed on one or more computers or other processors, perform methods that implement the various embodiments discussed above. The computer readable medium or media can be transportable, such that the program or programs stored thereon can be loaded onto one or more different computers or other processors to implement various aspects as discussed above. As used herein, the term "non-transitory computer-readable storage medium" encompasses only a computer-readable medium that can be considered to be an article of manufacture or a machine and excludes transitory signals.

The terms "program" or "software" are used herein in a generic sense to refer to any type of computer code or set of computer-executable instructions that can be employed to program a computer or other processor to implement various aspects of, as discussed above. Additionally, it should be appreciated that according to one aspect of this embodiment, one or more computer programs that when executed perform methods need not reside on a single computer or processor, but may be distributed in a modular fashion amongst a number of different computers or processors to implement various aspects of embodiments described herein.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags, addresses or other mechanisms that establish relationship between data elements.

Various aspects of embodiments described herein may be used alone, in combination, or in a variety of arrangements not specifically discussed in the embodiments described in the foregoing and the concepts described herein are therefore not limited in their application to the details and arrangement of components set forth in the foregoing description or illustrated in the drawings. For example, aspects described in one embodiment may be combined in any manner with aspects described in other embodiments.

Also, embodiments described herein may provide a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While embodiments have been described with reference to certain exemplary features thereof, those skilled in the art may make various modifications to the described embodiments. The terms and descriptions used herein are set forth by way of illustration only and not meant as limitations. In particular, although embodiments have been described by way of examples, a variety of devices would practice the inventive concepts described herein. Embodiments have been described and disclosed in various terms, the scope of the embodiments is not intended to be, nor should it be deemed to be, limited thereby and such other modifications or embodiments as may be suggested by the teachings herein are particularly reserved, especially as they fall within the breadth and scope of the claims here appended. Those skilled in the art will recognize that these and other variations are possible as defined in the following claims and their equivalents. Although the foregoing invention has been described in some detail by way of illustration and example for purposes of clarity and understanding, it may be readily apparent to those of ordinary skill in the art in light of the teachings of this invention that certain changes and modifications may be made thereto without departing from the spirit or scope of the appended claims.

All publications and patents cited in this specification are herein incorporated by reference as if each individual publication or patent were specifically and individually indicated to be incorporated by reference in their entirety.

REFERENCES

ARM, IBM, "The Internet of Things Business Index 2017, Transformation In Motion", The Economist, Intelligence Unit Limited 2017, pages 1-22.

Crosby, et al., "Blockchain Technology: Beyond Bitcoin", Applied Innovation Review, Issue No. 2, Sutardja Center for Entrepreneurship & Technology, Berkeley Engineering, June 2016, pages 1-19.

Fisher, "Decentralized Peer to Peer Game Assets Platform, Integration with Third Party Games using Smart Contract," Aug. 4, 2014, 12 pages.

Hinton et al., "A Fast Learning Algorithm For Deep Belief Nets", Neural Computation, 18, 1527-1554, 2006.

Jouppi, et al., "In-Datacenter Performance Analysis of a Tensor Processing Unit™", To appear at the 44th International Symposium on Computer Architecture (ISCA), Toronto, Canada, Jun. 26, 2017, pages 1-17.

LeCun, et al., "Deep Learning", Nature, Vol. 521, 28 May 2015, pages 436-444.

Marvin, "Blockchain A-Z: Everything You Need to Know About the Game-Changing Tech Beneath Bitcoin", Jun. 3, 2016, 9 pages.

Marvin, "Blockchain: The Invisible Technology That's Changing the World", Feb. 6, 2017, 32 pages.

Mougayar, The Business Blockchain, pages 6-9, 128-133, 2016, published by John Wiley & Sons, Hoboken, New Jersey.

Nakamoto, "Bitcoin-A Peer to Peer Electronic Cash System", 2008, pages. 1-9

Ng, "What Artificial Intelligence Can and Can't Do Right Now", Harvard Business Review, Nov. 9, 2016, 5 pages.

O'Dowd, et al., "IBM's Open Blockchain, Making Blockchain Real for Enterprises", IBM Blockchain, April 2016, pages 1-20.

Ronan, "Deep Learning predicts Loto Numbers", Academy of Paris, Apr. 1, 2016, pages 1-4.

Smart Contract Alliance, "Smart Contracts: 12 Use Cases for Business and Beyond, A Technology, Legal & Regulatory Information, prepared by Smart Contracts Alliance—In collaboration with Deloitte, An industry initiative of the Chamber of Digital Commerce", December 2016, pages 1-53.

Turing, "Computing Machinery and Intelligence", Mind 49:1950, pages 433-460.

Wood, "Ethereum: A Secure Decentralized Generalized Transaction Ledger", Homestead Draft, 2014, pages 1-32.

Wu, et al., "Google's Neural Machine Translation System: Bridging the Gap between Human and Machine Translation", 8 Oct. 2016, pages 1-23.

Yli-Huumo, et al., "Where Is Current Research on Blockchain Technology? A Systematic Review", Oct. 3, 2016, pages 1-27.

Glossary

51% Attack: An attack on the Bitcoin network which allows the attacker to create fraudulent transactions, see Double Spend. This is possible because controlling more than 50% of the Bitcoin network's hash rate means the attacker can out-compute everyone else who is mining.

A

Account: Accounts have an intrinsic balance and transaction count maintained as part of the Ethereum state. They also have some (possibly empty) EVM Code and a (possibly empty) Storage State associated with them. Though homogenous, it makes sense to distinguish between two practical types of account: those with empty associated EVM Code (thus the account balance is controlled, if at all, by some external entity) and those with non-empty associated EVM Code (thus the account represents an Autonomous Object). Each Account has a single Address that identifies it.

Address: A bitcoin address is used to receive and send transactions on the bitcoin network. It contains a string of alphanumeric characters, but can also be represented as a scannable QR code. A bitcoin address is also the public key in the pair of keys used by bitcoin holders to digitally sign transactions (see Public Key).

Address: A code, e.g. a 160-bit code, used for identifying Accounts.

Agreement Ledger: An agreement ledger is distributed ledger used by two or more parties to negotiate and reach agreement.

Airdrop: A method of distributing cryptocurrency amongst a population, first attempted with Auroracoin (auroracoin) in early 2014.

Algorithm: A process or set of rules to be followed in calculations or other problem-solving operations, especially by a computer.

Altcoin: The collective name for cryptocurrencies offered as alternatives to bitcoin. Litecoin, Feathercoin and PPcoin are all altcoins.

AML: Anti-Money Laundering techniques are used to stop people converting illegally obtained funds, to appear as though they have been earned legally. AML mechanisms can be legal or technical in nature. Regulators frequently apply AML techniques to bitcoin exchanges.

App: An end-user-visible application, e.g. hosted in the Ethereum Browser.

Application Program Interface (API): A specification used as an interface by components, often software components, to communicate with one another. May include specifications for routines, data structures, object classes, and variables.

Arbitrage: The generation of risk free profits by trading between markets which have different prices for the same asset.

ASIC: An Application Specific Integrated Circuit is a silicon chip specifically designed to do a single task. In the case of bitcoin, they are designed to process SHA-256 hashing problems to mine new bitcoins.

ASIC Miner: A piece of equipment containing an ASIC chip, configured to mine for bitcoins. They can come in the form of boards that plug into a backplane, devices with a USB connector, or standalone devices including all of the necessary software, that connect to a network via a wireless link or ethernet cable.

ASIC Mining: Many miners purchase separate computing devices set aside solely for mining. As an alternative, they can also get an Application Specific Integrated Circuit (ASIC); this is a specially-designed computer chip created to perform one specific function, and only that function—in this case, mining calculations. ASICs reduce the processing power and energy required for mining, and can help reduce the overall cost of the process in that way. Whether the ASIC—a term that refers to the specialized chip itself—is integrated into an existing computing system, or functions as a stand-alone device, the term "ASIC" is often used generically to refer to the overall system itself, and not just the chip.

Asymmetric Key Algorithm: This is the algorithm used to generate public and private keys, the unique codes that are essential to cryptocurrency transactions. In a symmetric key algorithm, both the sender and receiver have the same key; they can encrypt and exchange information privately, but since both parties have the decoding information, they can't keep information private from one another. With an asymmetric key algorithm, both parties have access to the public key, but only the person with the private key can decode the encryption; this assures that only they can receive the funds.

Attestation Ledger: A distributed ledger providing a durable record of agreements, commitments or statements, providing evidence (attestation) that these agreements, commitments or statements were made.

Autonomous Agents: Software that makes decisions and acts on them without human intervention.

Autonomous Object: A notional object existent only within the hypothetical state of Ethereum. Has an intrinsic address and thus an associated account; the account will have non-empty associated EVM Code. Incorporated only as the Storage State of that account.

B

Base58: Base58 encodes binary data into text and is used to encode Bitcoin addresses. Created by Satoshi Nakamoto, its alphanumeric characters exclude "0", "O", "1", I"since they are hard to distinguish.

Base58Check: A variant of Base58 used to detect typing errors in bitcoin addresses.

BIP: An acronym for "Bitcoin Improvement Proposals" which can be submitted by anyone who wants to improve the Bitcoin network.

Bit: Name of a Bitcoin denomination equal to 100 satoshis (1 millionth of 1 BTC). In 2014 several companies including Bitpay and Coinbase, and various wallet apps adopted bit to display bitcoin amounts.

Bitcoin (uppercase): The well know cryptocurrency, based on the proof-of-work blockchain.

bitcoin (lowercase): The specific collection of technologies used by Bitcoin's ledger, a particular solution. Note that the currency is itself one of these technologies, as it provides the miners with the incentive to mine.

Bitcoin (unit of currency): 100,000,000 satoshis. A unit of the decentralized, digital currency which can be traded for goods and services. Bitcoin also functions as a reserve currency for the altcoin ecosystem.

Bitcoin 2.0: A reference word for applications of bitcoin or Blockchain technology that is more advanced or complicated than the basic payment system application proposed by the Bitcoin white paper. Examples of Bitcoin 2.0 projects include Counterparty, Ethereum, Blockstream, Swarm, Domus and Hedgy.

Bitcoin ATM: A bitcoin ATM is a physical machine that allows a customer to buy bitcoin with cash. There are many manufacturers, some of which enable users to sell bitcoin for cash. They are also sometimes called 'BTMs' or 'Bitcoin AVMS'. CoinDesk maintains a worldwide map of operational bitcoin ATM machines and a list of manufacturers.

Bitcoin Core: New name of Bitcoin QT since release of version 0.9 on Mar. 19, 2014. Not to confuse with CoreBitcoin, an Objective-C implementation published in August 2013.

Bitcoind: Original implementation of Bitcoin with a command line interface. Currently a part of BitcoinQT project. "D" stands for "daemon" per UNIX tradition to name processes running in background.

Bitcoin Days Destroyed: An estimate for the "velocity of money" with the Bitcoin network. This is used because it gives greater weight to bitcoins that have not been spent for a long time, and better represents the level of economic activity taking place with bitcoin than total transaction volume per day.

Bitcoin Investment Trust: This private, open-ended trust invests exclusively in bitcoins and uses a state-of-the-art protocol to store them safely on behalf of its shareholders. It provides a way for people to invest in bitcoin without having to purchase and safely store the digital currency themselves.

Bitcoinj: A Java implementation of a full Bitcoin node by Mike Hearn. Also includes SPV implementation among other features.

BitcoinJS: An online library of javascript code used for Bitcoin development, particularly web wallets. bitcoinjs.org (http://bitcoinjs.org)

Bitcoin Market Potential Index (BMPI): The Bitcoin Market Potential Index (BMPI) uses a data set to rank the potential utility of bitcoin across 177 countries. It attempts to show which markets have the greatest potential for bitcoin adoption.

Bitcoin Network: The decentralized, peer-to-peer network which maintains the blockchain. This is what processes all Bitcoin transactions.

Bitcoin Price Index (BPI): The CoinDesk Bitcoin Price Index represents an average of bitcoin prices across leading global exchanges that meet criteria specified by the BPI. There is also an API for developers to use.

Bitcoin Protocol: The open source, cryptographic protocol which operates on the Bitcoin network, setting the "rules" for how the network runs.

BitcoinQT: Bitcoin QT is an open source software client used by your computer. It contains a copy of the blockchain and once installed it turns your computer into a node in the Bitcoin Network. Also acts as a "desktop wallet."

Bitcoin-ruby: A Bitcoin utilities library in Ruby by Julian Langschaedel. Used in production on Coinbase.com Bitcoin Sentiment Index (BSI): The Bitcoin Sentiment Index is a measure of whether individuals feel the digital currency's prospects are increasing or decreasing on any given day, and is powered by data collected by Qriously.

Bitcoin Whitepaper: The bitcoin whitepaper was written by 'Satoshi Nakamoto' and posted to a Cryptography Mailing list in 2008. The paper describes the bitcoin protocol in detail, Satoshi Nakamoto followed this by releasing the bitcoin code in 2009.

Bitcoin white paper: In November 2008, a paper, authored (probably pseudonymously) by Satoshi Nakamoto, was posted on the newly created Bitcoin.org website with the title 'Bitcoin: A Peer-to-Peer Electronic Cash System'. The eight-page document described methods of using a peer-to-peer network to generate "a system for electronic transactions without relying on trust" and laid down the working principles of the cryptocurrency.

Bitcore: A Bitcoin toolkit by Bitpay written in JavaScript. More complete than Bitcoinjs.

BitPay: A payment processor for bitcoins, which works with merchants, enabling them to take bitcoins as payment.

BitStamp: An exchange for bitcoins that has been gaining in popularity.

Block: This is a collection of transaction data, one of the fundamental elements of cryptocurrency. As transactions are made, the pertinent information for each one is collected, and when the gathered data reaches a predetermined size, it's bundled up as a block. As soon as possible after blocks are created, they're processed by investors for transaction verification; this process is known as mining.

Blockchain: The full list of blocks that have been mined since the beginning of the bitcoin cryptocurrency. The blockchain is designed so that each block contains a hash drawing on the blocks that came before it. This is designed to make it more tamperproof. To add further confusion, there is a company called Blockchain, which has a very popular blockchain explorer and bitcoin wallet.

Block Halving: [see Halving] The halving of the bitcoin reward that miners receive for mining a block. This takes place approximately every 4 years (every 210,000 block to be precise).

Block Header: Contains information about a block, such as the hash of the previous block header, its version number, the current target, a timestamp, and a nonce.

Block Height: Block height refers to the number of blocks connected together in the block chain. For example, Height 0, would be the very first block, which is also called the Genesis Block.

Blockchain.info: A web service running a Bitcoin node and displaying statistics and raw data of all the transactions and blocks. It also provides a web wallet functionality with lightweight clients for Android, IOS and OS X.

Block Reward: The reward given to a miner which has successfully hashed a transaction block. This can be a mixture of coins and transaction fees, depending on the policy used by the cryptocurrency in question, and whether all of the coins have already been successfully mined, Bitcoin currently awards 25 bitcoins for each block. The block reward halves when a certain number of blocks have been mined. In bitcoin's case, the threshold is every 210,000 blocks.

Bootstrapping: Technique for uploading the program onto a volunteer's computer or mobile device through a few simple instructions that set the rest of the program in motion.

BOT Trading: Software programs that operate on trading platforms, executing buy and sell orders with pre-programmed trading instructions.

Brain Wallet: [see Wallet] A bitcoin wallet which uses a long string of words to secure its coins. This "passphrase" can be memorized, allowing the wallet owner to spend bitcoins by simply remembering the passphrase.

Brainwallet.org: Utility based on bitcoin to craft transactions by hand, convert private keys to addresses and work with a brain wallet.

BTC: The short currency abbreviation for bitcoins.

Buy Order: A buy order is established when an investor approaches an exchange and wants to purchase cryptocurrency. These can range from very simple orders ("I want to spend x amount of dollars on Bitcoins") to complex ones that include factors such as time frame in which the order should be filled, range of price, and so forth. Most exchanges allow for these to be entered online, but some investors prefer to go over the details directly with an exchange representative. Buy orders don't necessarily guarantee your purchase; if your price is too low, for example, the offer may expire without being filled unless you make adjustments

C

Capital Controls: These are local measures such as transaction taxes, limits, or other prohibitions that a government can use to regulate flows from capital markets into and out of the country.

Casascius Coins: Physical collectible coins produced by Mike Caldwell. Each coin contains a private key under a tamper-evident hologram. The name "Casascius" is formed from a phrase "call a spade a spade", as a response to a name of Bitcoin itself.

Central Ledger: A central ledger refers to a ledger maintained by a central agency.

Change: Informal name for a portion of a transaction output that is returned to a sender as a "change" after spending that output. Since transaction outputs cannot be partially spent, one can spend 1 BTC out of 3 BTC output only be creating two new outputs: a "payment" output with 1 BTC sent to a payee address, and a "change" output with remaining 2 BTC (minus transaction fees) sent to the payer's addresses. BitcoinQT always uses new address from a key pool for a better privacy. Blockchain.info sends to a default address in the wallet. A common mistake when working with a paper wallet or a brain wallet is to make a change transaction to a different address and then accidentally delete it. E.g. when importing a private key in a temporary Bitcoin QT wallet, making a transaction and then deleting the temporary wallet.

Checkpoint: A hash of a block before which the BitcoinQT client downloads blocks without verifying digital signatures for performance reasons. A checkpoint usually refers to a very deep block (at least several days old) when it is clear to everyone that the block is accepted by the overwhelming majority of users and reorganization with not happen past that point. It also helps protecting most of the history from a 51% attack. Since checkpoints affect how the main chain is determined, they are part of the protocol and must be recognized by alternative clients (although the risk of reorganization past the checkpoint would be incredibly low).

Circle: Circle is an exchange and wallet service, offering users worldwide the chance to store, send, receive and exchange bitcoins.

Client: A software program running on a desktop or laptop computer, or mobile device. It connects to the bitcoin network and forwards transactions. It may also include a bitcoin wallet (see Node).

the Cloud: A reference to the Internet and functions it can carry out for anyone such as storage, file sending, and using apps.

Cloud-hashing/mining: A type of mining where people can pay to rent computer power from someone else in the cloud to mine bitcoin or other cryptocurrencies. This is done by selling mining contracts. Cloudhashing is also the name of a business which offers this service.

Coin: An informal term that means either 1 bitcoin, or an unspent transaction output that can be spent.

Coin Age: The age of a coin, defined as the currency amount multiplied by the holding period.

Coinbase: Another name for the input used in a bitcoin's generation transaction. When a bitcoin is mined, it doesn't come from another bitcoin user, but is generated as a reward for the miner. That reward is recorded as a transaction, but instead of another user's bitcoin address, some arbitrary data is used as the input. Coinbase is also the name of a bitcoin wallet service that also offers payment processing services for merchants and acts as an intermediary for purchasing bitcoins from exchanges.

Coinbase.com: US-based Bitcoin/USD exchange and web wallet service.

Cold Storage: The safest way to store private keys is by keeping them offline in "cold storage". This could be in the form of a hardware wallet, USB stick or paper wallet. These wallets are known as "cold wallets".

Collective Mining: The commitment of resources and materials to the process of mining digital currency data blocks often proves to be too expensive for individuals to take part. As a result, many enterprising businesses have worked out a way to make mining more affordable for those miners who would otherwise be left out. These companies invest in the hardware that allows for high-end mining power, and they in turn lease the access to this mining capability to third parties. As an individual miner, this means you can sign a contract that allows you to use a predetermined amount of mining power through cloud computing, without the hassle or expense of buying or maintaining the processing power needed to do so. The block rewards that come with the successful mining of the data block go to the individual miner who purchased the contract from the collective mining company.

Colored Coins: A proposed add-on function for bitcoin that would enable bitcoin users to give them additional attributes. These attributes could be user-defined, enabling you to mark a bitcoin as a share of stock, or a physical asset. This would enable bitcoins to be traded as tokens for other property.

CompactSize: Original name of a variable-length integer format used in transaction and block serialization. Also known as "Satoshi's encoding". It uses 1, 3, 5 or 9 bytes to represent any 64-bit unsigned integer. Values lower than 253 are represented with 1 byte. bytes 253, 254 and 255 indicate 16-, 32- or 64-bit integer that follows. Smaller numbers can be presented different. In bitcoin-ruby it is called "var_int", in Bitcoinj it is Varint. BitconQT also has even more compact representation called Varint which is not compatible with CompactSize and used in block storage.

Confirmation: The act of hashing a bitcoin transaction successfully into a transaction block, and cementing its validity. A single confirmation will take around 10 minutes, which is the average length of time for a transaction block to be hashed. However, some more sensitive or larger transactions may require multiple confirmations, meaning that more blocks must be hashed and added to the blockchain after the transaction's block has been hashed. Each time another block is added to the blockchain after the transaction's block, the transaction is confirmed again.

Confirmation Number: Confirmation number is a measure of probability that transaction could be rejected from the main chain. "Zero confirmations" means that transaction is unconfirmed (not in any block yet). One confirmation means that the transaction is included in the latest block in the main chain. Two confirmations means the transaction is included in the block right before the latest one. Probability of transaction being reversed ("double spent") is diminishing exponentially with more blocks added "on top" of it.

Confirmed Transaction: Transaction that has been included in the blockchain. Probability of transaction being rejected is measured in a number of confirmations.

Consensus Point: A point-either in time, or defined in terms of a set number or volume of records to be added to the ledger—where peers meet to agree the state of the ledger.

Consensus Process: The process a group of peers responsible for maintaining a distributed ledger used to reach consensus on the ledger's contents.

Contract: Informal term used to mean both a piece of EVM Code that may be associated with an Account or an Autonomous Object.

Core Developers: Programmers working on the open-source Source Code for Bitcoin. They are not formally employed by or paid by, and are not in control of, the Bitcoin Network; however, they have elevated access on the GitHub resource page for the Bitcoin Network where the main "reference" version of the Source Code is developed.

Counterfeiting: The act of imitating something in order to commit fraudulent behavior. An example of this is shopping with fake money.

CPU: Central Processing Unit—the 'brain' of a computer. In the early days, these were used to hash bitcoin transactions, but are now no longer powerful enough. They are still sometimes used to hash transactions for altcoins.

Crowdsourcing: The pooling of resources such as information or money contributed by the general population, to a goal. This is usually done online via websites where people can donate.

Cryptocurrency: A form of currency based on mathematics alone. Instead of fiat currency, which is printed, cryptocurrency is produced by solving mathematical problems based on cryptography.

Cryptography: The use of mathematics to create codes and ciphers that can be used to conceal information. Used as the basis for the mathematical problems used to verify and secure bitcoin transactions.

CSRNG: Acronym for "Cryptographically Secure Random Number Generator", used in private key generation for bitcoin wallets.

Cyberclones: Created by corporations by fracking digital world for their data.

D

DAO: An acronym for "Decentralised Autonomous Organization", a theoretical company that could exist in the cloud and carry out business according to preset algorithms, needing no human management. Also known as "DACs".

Darksend: Darksend is Darkcoin's decentralized mixing implementation, which was designed to give users of Darkcoin greater transactional privacy/anonymity.

DDOS: A distributed denial of service attack uses large numbers of computers under an attacker's control to drain the resources of a central target. They often send small amounts of network traffic across the Internet to tie up computing and bandwidth resources at the target, which prevents it from providing services to legitimate users. Bitcoin exchanges have sometimes been hit with DDOS attacks.

Deepweb: The content online not indexed by search engines making it difficult to access. The majority of content on the Internet resides on the deepweb and can be accessed using a program called TOR.

Demurrage: Certain currencies penalize users for hoarding, this is done via demurrage, where a fee is charged for holding unspent coins. This fee increases as time passes.

Denial of Service [DoS]: Is a form of attack on the network. Bitcoin nodes punish certain behavior of other nodes by banning their IP addresses for 24 hours to avoid DoS. Also, some theoretical attacks like 51% attack may be used for network-wide DoS.

Depth: Depth refers to a place in the blockchain. A transaction with 6 confirmations can also be called "6 blocks deep".

Desktop Wallet: A wallet that stores the private keys on your computer, which allow the spending and management of your bitcoins.

Deterministic Wallet: A wallet based on a system of deriving multiple keys from a single starting point known as a seed. This seed is all that is needed to restore a wallet if it is lost and can allow the creation of public addresses without the knowledge of the private key.

Difficulty: This number determines how difficult it is to hash a new block. It is related to the maximum allowed number in a given numerical portion of a transaction block's hash. The lower the number, the more difficult it is to produce a hash value that fits it. Difficulty varies based on the amount of computing power used by miners on the bitcoin network. If large numbers of miners leave a network, the difficulty would decrease.

Digital Certificate: Pieces of code that protect messages without the encrypt-decrypt operations but users must apply (and pay an annual fee) for individual certificates and most common e-mail services do not support them (Google, Outlook, Yahoo).

Digital Commodity: A digital commodity is a scarce, electronically transferrable, intangible, with a market value.

Digital Identity: A digital identity is an online or networked identity adopted or claimed in cyberspace by an individual, organization or electronic device.

Distributed Autonomous Enterprise [DAE]: Requires little or no traditional management or hierarchy to generate customer value and owner wealth.

Distributed Application [DAPP]: A set of smart contracts that stores data on a home-listings blockchain.

Distributed Capitalism: Lowering barriers to participation.

Distributed Ledger: Distributed ledgers are a type of database that are spread across multiple sites, countries or institutions. Records are stored one after the other in a continuous ledger. Distributed ledger data can be either "permissioned" or "unpermissioned" to control who can view it.

Double Spending: The act of spending bitcoins twice. It happens when someone makes a transaction using bitcoins, and then makes a second purchase from someone else, using the same bitcoins. They then convince the rest of the network to confirm only one of the transactions by hashing it in a block. Double spending is not easy to do, thanks to the way that the bitcoin network operates, but it is nevertheless a risk run by those accepting zero-confirmation transactions.

Dust: A transaction output that is smaller than a typically fee required to spend it [sic]. This is not a strict part of the protocol, as any amount more than zero is valid. BitcoinQT refuses to mine or relay "dust" transactions to avoid uselessly increasing the size of unspent transaction outputs (UTXO) index.

Dust Transaction: A transaction for an extremely small amount of bitcoins, which offers little financial value, but takes up space in the blockchain. The bitcoin developer team has taken efforts to eliminate dust transactions by increasing the minimum transaction amount that will be relayed by the network.

E

ECDSA: The Elliptic Curve Digital Signature Algorithm is the lightweight cryptographic algorithm used to sign transactions in the Bitcoin protocol.

Elliptic Curve Arithmetic: A set of mathematical operations defined on a group of points on a 2D elliptic curve. Bitcoin protocol uses predefined curve secp256k1. Here is the simplest possible explanation of the operations: you can add and subtract points and multiply them by an integer. Dividing by an integer is computationally infeasible (otherwise cryptographic signatures will not work). The private is a 256-bit integer and the public key is a product of a predefined point G ("generator") by that integer: A=G*a. Associativity law allows implementing interesting cryptographic schemes like Diffie-Hellman key exchange (ECDH): two parties with private keys a and b may exchange their public keys A and B to compute a shared secret point C: C+A*b=B*a because (G*a)*==(G*b)*a. The this point C can be used as a AES encryption key to protect their communication channel.

'Entertainment': states, displays, user experience, stimuli (light, sound, tactile), Title/Value Transfer, game Escrow: The act of holding funds or assets in a third-party account to protect them during an asynchronous transaction.

ETF: Acronym for "Exchange Traded Fund". These are investment funds traded on stock markets that track the price index of an underlying asset.

Ethereum Browser: (aka Ethereum Reference Client) A cross-platform GUI of an interface similar to a simplified browser (a la Chrome) that is able to host sandboxed applications whose backend is purely on the Ethereum protocol.

Ethereum Runtime Environment: (aka ERE) The environment which is provided to an Autonomous Object executing in the EVM. Includes the EVM but also the structure of the world state on which the EVM relies for certain I/O instructions including CALL & CREATE.

Ethereum Virtual Machine: (aka EVM) The virtual machine that forms the key part of the execution model for an Account's associated EVM Code.

EVM Assembly: The human-readable form of EVM code.

EVM Code: The bytecode that the EVM can natively execute. Used to formally specify the meaning and ramifications of a message to an Account.

Exchange: A central resource for exchanging different forms of money and other assets. Bitcoin exchanges are typically used to exchange the cryptocurrency for other, typically fiat, currencies.

External Actor: A person or other entity able to interface to an Ethereum node, but external to the world of Ethereum. It can interact with Ethereum through depositing signed Transactions and inspecting the blockchain and associated state. Has one (or more) intrinsic Accounts.

Extra Nonce: A number placed in coinbase script and incremented by a miner each time the nonce 32-bit integer overflows. This is not the required way to continue mining when nonce overflows, one can also change the merkle tree of transactions or change a public key used for collecting a block reward.

F

Faucet: A technique used when first launching an altcoin. A set number of coins are pre-mined, and given away for free, to encourage people to take interest in the coin and begin mining it themselves.

Fiat Currency: A currency, conjured out of thin air, which only has value because people say it does. Constantly under close scrutiny by regulators due to its known application in money laundering and terrorist activities. Not to be confused with bitcoin.

Fill or Kill: This is a simple type of buy order made with a cryptocurrency exchange. The investor dictates how much currency they want, and at what price, and establishes a cutoff date for the order. The exchange will then do their best to fill the order according to those criteria. If the exchange hasn't found an appropriate match for the order by the cutoff date, the order is canceled and left unfilled. In other words, fill this order according to these guidelines and within this time frame. If you can't, kill it FinCEN: The Financial Crimes Enforcement Network, an agency within the US Treasury Department. FinCEN has thus far been the main organization to impose regulations on exchanges trading in bitcoin.

Fork: The creation of an alternative ongoing version of the blockchain, typically because one set of miners begins hashing a different set of transaction blocks from another. It can be caused maliciously, by a group of miners gaining too much control over the network (see 51% attack), accidentally, thanks to a bug in the system, or intentionally, when a core development team decides to introduce substantial new features into a new version of a client. A fork is successful if it becomes the longest version of the blockchain, as defined by difficulty.

FPGA: A Field Programmable Gate Array is a processing chip that can be configured with custom functions after it has been fabricated. Think of it as a blank silicon slate on which instructions can be written. Because FPGAs can be produced en masse and configured after fabrication, manufacturers benefit from economies of scale, making them cheaper than ASIC chips.

Freicoin: A cryptocurrency based on the inflation-free principles outlined by the economist Silvio Gessell.

Frictionless: In reference to payment systems, a system is "frictionless" when there are zero transaction costs or restraints on trading.

Full Node: A node which implements all of bitcoin protocol and does not require trusting any external service to validate transactions. It is able to download and validate the entire blockchain. All full nodes implement the same peer-to-peer messaging protocol to exchange transactions and blocks, but that is not a requirement. A full node may receive and validate data using any protocol and from any source. However, the highest security is achieved by being able to communicate as fast as possible with as many nodes as possible.

G

Gas: The fundamental network cost unit. Paid for exclusively by Ether (as of PoC-4), which is converted freely to and from Gas as required. Gas does not exist outside of the internal Ethereum computation engine; its price is set by the Transaction and miners are free to ignore Transactions whose Gas price is too low.

Genesis Block The very first block in the block chain.

Gigahashes/sec: The number of hashing attempts possible in a given second, measured in billions of hashes (thousands of Megahashes).

GPU: Graphical Processing Unit. A silicon chip specifically designed for the complex mathematical calculations needed to render millions of polygons in modern computer game graphics. They are also well suited to the cryptographic calculations needed in cryptocurrency mining.

Graph Gaps: On occasion, gaps will appear in trend lines on market value graphs. These gaps indicate a visible drop or rise in a commodity's value that hasn't necessarily happened due to trading. These can be the result of closed markets, statistical adjustments by analysts, or by strong news about the commodity. There are three types of gaps:

1. Breakaway Gap. These appear at the beginning of a strong upward or downward trend, and represent very high-volume trading.
2. Runaway Gap. These occur during an upward or downward trend, and represent a quick momentary intensification of that trend.
3. Exhaustion Gap. This occurs toward the end of an upward or downward trend, and tends to indicate a small trend in the opposite direction

H

Halving: Bitcoins have a finite supply, which makes them a scarce digital commodity. The total amount of bitcoins that will ever be issued is 21 million. The number of bitcoins generated per block is decreased 50% every four years. The final halving will take place in the year 2140.

Hard Fork: Some people use term hard fork to stress that changing Bitcoin protocol requires overwhelming majority to agree with it, or some noticeable part of the economy will continue with original blockchain following the old rules.

Hardware Wallet: A bitcoin wallet which stores users bitcoins offline on hardware devices Hash: A mathematical process that takes a variable amount of data and produces a shorter, fixed-length output. A hashing function has two important characteristics. Firstly, it is mathematically difficult to work out what the original input was by looking at the output. Secondly, changing even the tiniest part of the input will produce an entirely different output.

to HASH: To compute a hash function of some data. If hash function is not mentioned explicitly, it is the one defined by the context. For instance, “to hash a transaction” means to compute Hash256 of binary representation of a transaction.

Hash160: SHA-256 hashed with RIPEMD-160 it is used to produce an address because it makes a smaller hash (20 bytes vs. 32 bytes) than SHA-256, but still uses SHA-256 internally for security. BTCHash160( ) in CoreBitcoin. Hash160( ) in BitcoinQT. It is also available in scripts as OP_HASH160.

Hash, Hash256: When not speaking about arbitrary hash functions, Hash refers to two rounds of SHA-256. That is, you should compute a SHA-256 hash of your data and then another SHA-256 hash of that hash. It is used in block header hashing, transaction hashing, making a merkle tree of transactions, or computing a checksum of an address. Known asBTCHash2560( ) in CoreBitcoin, Hash( ) in BitcoinQT. It is also available in scripts as OP_HASH256.

Hash Function: A hash function takes an arbitrary input such as a string of integers (a key) and outputs a value of a pre-specified length (a hash). Bitcoin uses a cryptographic hash function to secure the network.

Hash Rate: The number of hashes that can be performed by a bitcoin miner in a given period of time (usually a second).

Hash Type (hashtype): A single byte appended to a transaction signature in the transaction input which describes how the transaction should be hashed in order to verify that signature. There are three types affecting outputs: ALL (default), SINGLE, NONE and one optional modifier ANYONECANPAY affecting the inputs (can be combined with either of the first three). ALL requires all outputs to be hashed (thus, all outputs are signed). SINGLE clears all output scripts but the one with the same index as the input in question. NONE clears all outputs thus allowing changing them at will. ANYONECANPAY removes all inputs except the current one (allows anyone to contribute independently.) The actual behavior is more subtle than this overview, you should check the actual source code for more comments.

Height: See Block Height

Hot Wallet: A bitcoin wallet that has an active connection to the Internet. These are used for “everyday” transactions and should never hold large amounts of bitcoin, since their connectivity reduces their security.

HTML: Acronym for “HyperText Markup Language”, the language in which webpages are written.

HTTP: Acronym for “HyperText Transfer Protocol”, this is the underlying protocol for the world wide web.

Hybrid Wallet: This is a cryptocurrency storage and maintenance system that is a combination of a software wallet (stored on a local computer) and a web wallet (stored on a third-party server). The bulk of your digital currency account information is stored on the wallet host’s server-except for one important detail. Your private key (the code that uniquely identifies you) is stored only on your own device. When you make a transaction, your private key is encrypted on the way to the exchange’s server, so they never know what your private key is. Access to your private key also includes a password that again only the user knows. If the user loses or forgets that password, access to the account could be denied, and the user could potentially lose the account balance forever.

I

Industrial Blockchain: Secure transactional capability to watches and other wearable devices.

Input: The part of a bitcoin transaction denoting where the bitcoin payment has come from. Typically, this will be a bitcoin address, unless the transaction is a generation transaction, meaning that the bitcoin has been freshly mined (see Coinbase).

Interface System and methods by which two or more computers talk to each other over a network, such as the Internet, using a common language that they both understand.

K

Key: Could mean an ECDSA public or private key, or AES symmetric encryption key. AES is not used in the protocol itself (only to encrypt the ECDSA keys and other sensitive data), so usually the word key means an ECDSA key. When talking about keys, people usually mean private keys as public key can always be derived from a private one. See Private Key and Public Key.

Key Pool: Some wallet applications that create new private keys randomly keep a pool of unused pre-generated keys (BitcoinQT keeps 100 keys by default). When a new key is needed for change address or a new payment request, the application provides the oldest key from the pool and replaces it with a fresh one. The purpose of the pool is to ensure that recently used keys are always already back up on external storage. Without a key pool you could create a new key, receive a payment on its address and then have your hard disk died before backing up this key. A key pool guarantees that this key was already backed up several days before being used. Deterministic wallets do not use a key pool because they need to back up a single secret key.

Kilohashes/sec: The number of hashing attempts possible in a given second, measured in thousands of hashes.

Kimoto Gravity Well: A mining difficult readjustment algorithm, which was created in 2013 for Megacoin, an altcoin. The well allows difficulty readjustment to occur every block, instead of every 2016 blocks for Bitcoin. This was done as a response to concern about multi pool mining schemes.

KYC: Know Your Client/Customer rules force financial institutions to vet the people they are doing business with, ensuring that they are legitimate.

L

Laundry: Also known as a “mixing service”, they combine funds from various users and redistribute them, making tracing the bitcoins back to their original source very difficult by mixing their “taint”.

Ledger: An append-only record store, where records are immutable and may hold more general information than financial records.

Ledger of Everything: Blockchain can address the six obstacles to a functioning Internet of Things features: resilient, robust, real-time, responsive, radically open, renewable, redactive, revenue-generating, reliable.

Leverage: In foreign currency trading, leverage multiplies the real funds in your account by a given factor, enabling you to make trades that result in significant profit. By giving leverage to a trader, the trading exchange is effectively lending them money, in the hope that it will earn back more than it loaned in commission. Leverage is also known as a margin requirement.

Lightweight Client: Comparing to full node, lightweight node does not store the whole blockchain and thus cannot fully verify any transaction. There are two kinds of lightweight nodes: those fully trusting an external service to determine wallet balance and validity of transactions (e.g. blockchain.info) and the apps implementing Simplified Payment Verification (SPV). SPV clients do not need to trust any particular service, but are more vulnerable to 51% attack than full nodes. See Simplified Payment Verification.

Litecoin: An altcoin based on the Scrypt proof of work.

Liquidity: The ability to buy and sell an asset easily, with pricing that stays roughly similar between trades. A suitably large community of buyers and sellers is important for liquidity. The result of an illiquid market is price volatility, and the inability to easily determine the value of an asset.

Liquidity Swap: As a financial instrument on cryptocurrency exchanges, liquidity swaps are contracts where investors offer loans to others to trade with in exchange for a set return.

LLL: The Lisp-like Low-level Language, a human-writable language used for authoring simple contracts and general low-level language toolkit for trans-compiling to.

Lock Time (locktime): A 32-bit field in a transaction that means either a block height at which the transaction becomes valid, or a UNIX timestamp. Zero means transaction is valid in any block. A number less than 500000000 is interpreted as a block number (the limit will be hit after year 11000), otherwise a timestamp.

Lottery: Defined by many states as prize, chance & consideration

M

MAC Media Access Control.

Main Chain: A part of the blockchain which a node considers the most difficult (see difficulty). All nodes store all valid blocks, including orphans and recompute the total difficulty when receiving another block. If the newly arrived block or blocks do not extend existing main chain, but create another one from some previous block, it is called reorganization.

Mainnet: Main Bitcoin network and its blockchain. The term is mostly used in comparison to testnet.

mBTC: 1 thousandth of a bitcoin (0.001 BTC).

Megahashes/sec: The number of hashing attempts possible in a given second, measured in millions of hashes (thousands of Kilohashes).

Mempool: A technical term for a collection of unconfirmed transactions stored by a node until they either expire or get included in the main chain. When reorganization happens, transactions from orphaned blocks either become invalid (if already included in the main chain) or moved to a pool of unconfirmed transactions. By default, bitcoind nodes throw away unconfirmed transactions after 24 hours.

Merged Mining: This allows a miner to work on multiple blockchains simultaneously, contributing to the hash rate (and thus security) of both currencies being mined. E.g. Namecoin has implemented merged mining with Bitcoin.

Merkle Tree: Merkle tree is an abstract data structure that organizes a list of data items in a tree of their hashes (like in Git, Mercurial or ZFS). In Bitcoin the merkle tree issued only to organize transactions within a block (the block header contains only one hash of a tree) so that full nodes may prune fully spent transactions to save disk space. SPV clients store only block headers and validate transactions if they are provided with a list of all intermediate hashes.

Message: Data (as a set of bytes) and Value (specified as Ether) that is passed between two Accounts, either through the deterministic operation of an Autonomous Object or the cryptographically secure signature of the Transaction.

Message Call: The act of passing a message from one Account to another. If the destination account is associated with non-empty EVM Code, then the VM will be started with the state of said Object and the Message acted upon. If the message sender is an Autonomous Object, then the Call passes any data returned from the VM operation.

Microtransaction: Paying a tiny amount for an asset or service, primarily online. Micro-transactions are difficult to perform under conventional payment systems, because of the heavy commissions involved. It is difficult to pay two cents to read an online article using your credit card, for example.

Miner: A computer participating in any cryptocurrency network performing proof of work. This is usually done to receive block awards.

Mining: The act of generating new bitcoins by solving cryptographic problems using computing hardware.

Mining Algorithm: The algorithm used by a cryptocurrency to sign transactions in the Bitcoin network, adding blocks onto the blockchain.

Mining Contract: A method of investing in bitcoin mining hardware, allowing anyone to rent out a pre-specified amount of hashing power, for an agreed amount of time. The mining service takes care of hardware maintenance, hosting and electricity costs, making it simpler for investors.

Mining Pool: A group of miners who have decided to combine their computing power for mining. This allows rewards to be distributed more consistently between participants in the pool.

Mint: Satoshi distributed the mint by linking the issuance of bitcoins to the creation of a new block ledger, putting the power to mint into all the hands of the peer network.

Mintage Cap: As cryptocurrency miners process blocks of transaction data, they generate new coins as a result. Cryptocurrency is a young industry, and its issuers want enough coins to go around to satisfy new investors as they join. These new coins are mathematically designed to be turned out at a stable rate, so the value of the currency will remain relatively stable, too (there will be fluctuations, as in any other commodity market, but not as wild as they would be if the commodity was extremely limited in availability). Over time, however, the mathematics of coin creation are also designed to end, to avoid over-saturation of the market and currency devaluation.

Minting: the process of rewarding users in proof of stake coins. New coins are minted as the reward for verifying transactions in a block.

Mixing: A process of exchanging coins with other persons in order to increase privacy of one's history. Sometimes it is associated with money laundering, but strictly speaking it is orthogonal to laundering. In traditional banking, a bank protects customer's privacy by hiding transactions from all 3rd parties. In Bitcoin any merchant may do a statistical analysis of one's entire payment history and determine, for instance, how many bitcoins one owns. While it is still possible to implement KYC (Know Your Customer) rules on a level of every merchant, mixing allows to be separate information about one's history between the merchants. Most important use cases for mixing are: 1) receiving a salary as a single bit monthly payment and then spending it in small transactions ("café sees thousands of dollars when you pay just $4"); 2) making a single payment and revealing connection of many small private spendings ("car dealer sees how much you are addicted to the coffee"). In both cases your employer, a café and a car dealer may comply with KYC/AML laws and report your identity and transferred amounts, but neither of them need to know about each other. Mixing bitcoins after receiving a salary and mixing them before making a big payment solves this privacy problem.

Mixing Service: Service that mixes your bitcoins with someone else's, sending you back bitcoins with different inputs and outputs from the ones that you sent to it. A mixing service (also known as a tumbler) preserves your privacy because it stops people tracing a particular bitcoin to you. It also has the potential to be used for money laundering.

Mobile Wallet: A wallet which runs a "Mobile client", allowing people to have bitcoin wallets on their phones and tablet computers and pay on the go.

Monetary Policy: Another breakthrough is to preserve value programmed into the software.

Money Laundering: The act of trying to "clean" money earned from criminal activity by converting these profits to what appear to be legitimate assets.

M-of-N Multi-signature Transaction: A transaction that can be spent using M signatures when N public keys are required (M is less or equal to N). Multi-signature transactions that only contain one OP_CHECKMULTSIG opcode and N is 3, 2 or 1 are considered standard.

Multisig: Multi-signature addresses allow multiple parties to partially seed an address with a public key. When someone wants to spend some of the bitcoins, they need some of these people to sign their transaction in addition to themselves. The needed number of signatures is agreed at the start when people create the address. Services using multi-signature addresses have a much greater resistance to theft.

N

Namecoin: An altcoin designed to provide an alternative to the traditional domain name system (DNS). Users can register .bit domains, accessible via proxy servers, by paying with namecoins.

Network Effect: The increase in value of a good or service that occurs when its use becomes more widespread.

NFC: Acronym for "Near Field Communication", a low power, short range method of wireless communication. This can be used to build upon RFID systems and is what contactless smart cards (oyster cards) and payment systems (paypass) use. Most recently implement in the Apple Pay app.

Node: A computer connected to the bitcoin network using a client that relays transactions to others (see client).

Nonce: A random string of data used as an input when hashing a transaction block. A nonce is used to try and produce a digest that fits the numerical parameters set by the bitcoin difficulty. A different nonce will be used with each hashing attempt, meaning that billions of nonces are generated when attempting to hash each transaction block.

Non-standard Transaction: Any valid transaction that is not standard. Non-standard transactions are not relayed or mined by default BitcoinQT nodes (but are relayed and mined on testnet). However, if anyone puts such transaction in a block, it will be accepted by all nodes. In practice it means that unusual transactions will take more time to get included in the blockchain. If some kind of non-standard transactions becomes useful and popular, it may get named standard and adopted by users (like it). See Standard Transaction.

Novacoin: Though this type of cryptocurrency is not yet near the value or overall investor numbers of the big players in the industry, Novacoin still holds a spot in the top five; not bad, considering it was introduced in February 2013. Novacoin uses the Scrypt mining algorithm, and is mined by the combined proof-of-work and proof-of-stake methods.

O

Object: Synonym for Autonomous Object.

Off Blockchain Transactions: Exchanges of value which occur off the blockchain between trusted parties. These occur because they are quicker and do not block the blockchain.

Off-Ledger Currency: A currency minted off-ledger and used on-ledger. An example of this would be using distributed ledgers to manage a national currency.

On-Ledger Currency: A currency minted on-ledger and used on-ledger. An example of this would be cryptocurrency.

Opcode: 8-bit code of script operation. Codes from 0x01 to 0x4B (decimal 75) are interpreted as a length of data to be pushed on the stack of the interpreter (data bytes follow the opcode). Other codes are either do something interesting, or disabled and cause transaction verification to fail, or do nothing (reserved for future use).

Open Network Enterprises: As smart contracts grow in complexity and interoperate with other contracts then contribute to this.

Open Source: The practice of sharing the source code for a piece of computer software, allowing it to be distributed and altered by anyone.

Orphan Block: A block which is not a part of the valid blockchain, but which was instead part of a fork that was discarded.

OTC Exchange: An exchange in which traders make deals with each other directly, rather than relying on a central exchange to mediate between them.

Output: The destination address for a bitcoin transaction. There can be multiple outputs for a single transaction.

Owners of Coin: Ethereum chose this as its economic set. Ripple and Stellar chose the social network.

Owners of the Computing Power: Satoshi chose this economic set. This requires these miners to consume a resource external to the network, namely electricity, if they want to participate in the reward system.

P

Paper Wallet: A printed sheet containing one or more public bitcoin addresses and their corresponding private keys. Often used to store bitcoins securely, instead of using software wallets, which can be corrupted, or web wallets, which can be hacked or simply disappear. A useful form of cold bitcoin storage.

Participant: An actor who can access the ledger: read records or add records to.

Pay-to-Script Hash: A type of script and address that allows sending bitcoins to arbitrary complex scripts using a compact hash of that script. This allows payer to pay much smaller transaction fees and not wait very long for a non-standard transaction to get included in the blockchain. Then the actual script matching the hash must be provided by the payee when redeeming the funds. P2SH addresses are encoded in Base58 Check just like regular public keys and start with number "3".

Peer: An actor that shares responsibility for maintaining the identity and integrity of the ledger.

P2P: Peer-to-peer. Decentralized interactions that happen between at least two parties in a highly interconnected network. An alternative system to a 'hub-and-spoke' arrangement, in which all participants in a transaction deal with each other through a single mediation point.

Permissioned Ledger: A permissioned ledger is a ledger where actors must have permission to access the ledger. Permissioned ledgers may have one or many owners. When a new record is added, the ledger's integrity is checked by a limited consensus process. This is carried out by trusted actors-government departments or banks, for example—which makes maintaining a shared record much simpler that the consensus process used by unpermissioned ledgers. Permissioned block chains provide high-verifiable data sets because the consensus process creates a digital signature, which can be seen by all parties. A permissioned ledger is usually faster than an unpermissioned ledger.

Phone-to-Phone Transfer: This is a mobile application feature that allows the instantaneous transfer of information from one smartphone to another. If two mobile device users want to exchange data, and both have this feature installed and activated on their phones, they can make the transfer simply by having their devices in close proximity to each other. These are also sometimes called "touch transfers."

Platform Exchange: This is a digital currency exchange that limits the role they play in transactions made between investors. The majority of exchanges are there to facilitate these transactions, and make them easier to carry out. The exchange will sort through buy and sell orders, and will then match up investors who meet the criteria of the order in question. Their algorithms are designed so the trades being made are both secure and fair to both parties involved. Beyond that, however, the exchange does not play any "middleman" or mediating role. This is in contrast to exchanges that will hold the transaction funds in escrow, or will discuss the details of the trade with both investors before moving forward.

Pool: A collection of mining clients which collectively mine a block, and then split the reward between them. Mining pools are a useful way to increase your probability of successfully mining a block as the difficulty rises.

PPCoin: AKA Peercoin or P2P coin. An altcoin using the proof of stake mechanism in conjunction with proof of work. Based on a paper produced by Sunny King and Scott Nadal.

Pre-mining: The mining of coins by a cryptocurrency's founder before that coin has been announced and details released to others who may wish to mine the coin. Pre-mining is a common technique used with scamcoins, although not all pre-mined coins are scamcoins (see Scamcoin).

Primecoin: Developed by Sunny King, Primecoin uses a proof of work system to calculate prime numbers.

Private Key (PrivKey): An alphanumeric string kept secret by the user, and designed to sign a digital communication when hashed with a public key. In the case of bitcoin, this string is a private key designed to work with a public key. The public key is a bitcoin address (see Bitcoin Address).

Process Node: The size of a transistor in nanometers, produced during a chip fabrication process. Smaller process nodes are more efficient.

Proof of Activity: Combines proof of work and proof of stake.

Proof of Burn: This is a method of "burning" one Proof of Work cryptocurrency in order to receive a different cryptocurrency. This is a form of "bootstrapping" one cryptocurrency off another, and is done by sending coins to a verifiable unspendable address.

Proof of Capacity: Requires miners to allot a sizeable volume of their hard drive to mining.

Proof of Existence: A service provided through the blockchain that allows anyone to anonymously and securely store a proof of existence for any document they choose online. This allows people to prove that a document existed at a certain point in time and demonstrate their ownership of it, without fear of that proof being taken from them.

Proof of Stake: An alternative to proof of work, in which your existing stake in a currency (the amount of that currency that you hold) is used to calculate the amount of that currency that you can mine.

Proof of Storage: Requires miners to allocate and share disk space in distributed cloud.

Proof of Work: A system that ties mining capability to computational power. Blocks must be hashed, which is in itself an easy computational process, but an additional variable is added to the hashing process to make it more difficult. When a block is successfully hashed, the hashing must have taken some time and computational effort. Thus, a hashed block is considered proof of work.

Prosumers: Customers who produce.

Protocol Evolution: Blockchain is the result of the natural evolution of internet protocols. Wired explains the story of how the original 1974 TCP/IP internet network protocol and Tim Berner-Lee's Hyper Text Transfer Protocol (HTTP) evolved in the same way as blockchain is evolving for the next generation of the Internet, bundling multiple protocols together to form the foundation of future frameworks and "watching the birth of the internet all over again".

PSP: Payment Service Provider. The PSP offers payment processing services for merchants who wish to accept payments online.

P2SH: See Pay-to-Script Hash.

Public Key (Pubkey): An alphanumeric string which is publicly known, and which is hashed with another, privately held string to sign a digital communication. In the case of bitcoin, the public key is a bitcoin address.

Q

QR Code: A two-dimensional graphical block containing a monochromatic pattern representing a sequence of data. QR or "Quick Response" codes are designed to be scanned by cameras, including those found in mobile phones, and are frequently used to encode bitcoin addresses.

R

Reference Implementation: Bitcoin QT (or bitcoind) is the most used full node implementation, so it is considered a reference for other implementations. If an alternative implementation is not compatible with BitcoinQT it may be forked, that is it will not see the same main chain as the rest of the network running BitcoinQT.

Relaying Transactions: Connected Bitcoin nodes relay new transactions between each other on best effort basis in order to send them to the mining nodes. Some transactions may not be relayed by all nodes. E.g. non-standard transactions, or transactions without a minimum fee. Bitcoin message protocol is not the only way to send the transaction. One may also send it directly to a miner, mine it yourself, or send it directly to the payee and make them to relay or mine it.

Remittance: A sum of money being sent, usually internationally, as a payment or gift.

Reorg, Reorganization: An event in the node when one or more blocks in the main chain become orphaned. Usually, newly received blocks are extending existing main chain. Sometimes (4-6 times a week) a couple of blocks of the same height are produced almost simultaneously and for a short period of time some nodes may see one block as a tip of the main chain which will be eventually replaced by a more difficult blocks(s). Each transaction in the orphaned blocks either becomes invalid (if already included in the main chain block) or becomes unconfirmed and moved to the mempool. In case of a major bug or a 51% attack, reorganization may involve reorganizing more than one block.

Replicated Ledger: A ledger with one master (authoritative) copy of the data, and many slave (non-authoritative) copies.

Reward: Amount of newly generated bitcoins that a miner may claim in a new block. The first transaction in the block allows miner to claim currently allowed reward as well as transaction fees from all transactions fees from all transactions in the block. Reward is halved ever 210000 blocks approximately every 4 years. As of Jul. 27, 2014 the reward is 25 BTC (the first halving occurred in December 2012). For security reasons, rewards cannot be spent before 100 blocks built on top of the current book.

Ripple: A payment network that can be used to transfer any currency (including ad hoc currencies that have been created by users). The network consists of payment nodes and gateways operated by authorities. Payments are made using a series of IOUs, and the network is based on trust relationships.

S

Satoshi: The smallest subdivision of a bitcoin currently available (0.00000001 BTC).

Satoshi Nakamoto: The name used by the original inventor of the Bitcoin protocol, who withdrew from the project at the end of 2010.

Scamcoin: An altcoin produced with the sole purpose of making money for the originator. Scamcoins frequently use pump and dump techniques and pre-mining together.

Script: A compact turing-incomplete programming language used in transaction inputs and outputs. Scripts are interpreted by a Forth-like stack machine: each operation manipulates data on the stack. Most scripts follow the standard pattern and verify the digital signature provided in the transaction input against a public key provided in the previous transaction's output. Both signatures and public keys are provided using scripts. Scripts may contain complex conditions, but can never change amounts being transferred. Amount is stored in a separate field in a transaction output.

scriptPubKey: Original name in bitcoind for a transaction output script. Typically, output scripts contain public keys (or their hashes: see Address) that allow only owner of a corresponding private key to redeem the bitcoins in the output.

scriptSig: Original name in bitcond for a transaction input script. Typically, input scripts contain signatures to prove ownership of bitcoins sent by a previous transaction.

Scrypt: An alternative proof of work system to SHA-256, designed to be particularly friendly to CPU and GPU miners, while offering little advantage to ASIC miners.

Secret Key: Either the Private Key or an encryption key is used in encrypted wallets. Bitcoin protocol does not use encryption anywhere, so secret key typically means a private key used for signing transactions.

Sequence: A 32-bit unsigned integer in a transaction input used to replace older version of a transaction by a newer one. Only used when locktime is not zero. Transaction is not considered valid until the sequence number is 0xFFFFFFFF.

Seed: The private key used in a "deterministic wallet".

Self-Executing Contract: Also known as "smart contracts" these are protocols that facilitate or enforce the obligations of contract without the need for human intervention.

SEPA: The Single European Payments Area. A payment integration agreement within the European Union, designed to make it easier to transfer funds between different banks and nations in euros.

SHA-256: The cryptographic function used as the basis for bitcoin's proof of work system.

Sidechain: These are theoretical, independent blockchains which are "two way pegged" to the Bitcoin blockchain. These can have their own unique features and can have bitcoins sent to and from them.

Signature: A digital digest produced by hashing private and public keys together to prove that a bitcoin transaction came from a particular address.

Simplified Payment Verification (SPV): A scheme to validate transactions without storing the whole blockchain (only block headers) and without trusting any external service. Every transaction must be present with all its parent and sibling hashes in a merkle tree up to the root. SPV client trusts the most difficult chain of block headers and can validate if the transaction indeed belongs to a certain block header. Since SPV does not validate all transactions, a 51% attack may not only cause a double spend (like with full nodes), but also make a completely invalid payment with bitcoins created from nowhere. However, this kind of attack is very costly and probably more expensive than a product in question. Bitcoinj library implements SPV functionally. (See SPV)

Smart Contracts: Smart contracts are contracts whose terms are recorded in a computer language instead of a legal language. Smart contracts can be automatically executed by a computing system, such as a suitable distributed ledger system.

Soft Fork: Sometimes the soft fork refers to an important change of software behavior that is not a hard fork (e.g. changing mining fee policy). See Hard Fork and Fork.

Source Code: The open-source software which includes protocols governing rules for movement and ownership of bitcoins and the cryptography system that secures and verifies Bitcoin transactions.

Speculator: An individual who speculates on the price of bitcoin or any other form of asset. Aiming to make profits by buying and selling at different prices.

Spent Output: A transaction output can be spent only once: when another valid transaction makes a reference to this output from its own input. When another transaction attempts to spend the same output, it will be rejected by the nodes already seeing the first transaction. Blockchain as a proof-of-work scheme allows every node to agree on which transaction was indeed the first one. The whole transaction is considered spent when all its outputs are spent.

Split: A split of a blockchain. See Fork.

SPV: Simplified Payment Verification. A feature of the Bitcoin protocol that enables nodes to verify payments without downloading the full blockchain. Instead, they need only download block headers.

Stale: When a bitcoin block is successfully hashed, any others attempting to hash it may as well stop, because it is now 'stale'. They would simply be repeating work that someone else has already done, for no reward. The term is also used in mining pools to describe a share of a hashing job that has already been completed.

Stale Block: A block that has already been solved and thus cannot offer miners any reward for further work on it.

Standard Transaction: Some transactions are considered standard, meaning they are relayed and mined by most nodes. More complex transactions could be buggy or cause DoS attacks on the network, so they are considered non-standard and not relayed or mined by most nodes. Both standard and non-standard transactions are valid and once included in the blockchain, will be recognized by all nodes. Standard transactions are: 1) sending to a public key, 2)

sending to an address, 3) sending to a P2SH address, 4) sending to a M-of-N multi-signature transaction where N is 3 or less.

Storage State: The information particular to a given Account that is maintained between the times that the Account's associated EVM Code runs.

T

Taint: An analysis of how closely related two addresses are when they have both held a particular bitcoin. A taint analysis could be used to determine how many steps it took for bitcoins to move from an address known for stolen coins, to the current address.

Target: A 256-bit number that puts an upper limit for a block header hash to be valid. The lower the target is, the higher the difficult to find a valid has. The maximum (easiest) target is 0x00000000FFFF0000000000000000000000 0000000000000000000000000000. The difficulty and the target are adjusted every 2016 blocks (approx. 2 weeks) to keep interval between the blocks close to 10 minutes.

TCP/IP: Acronyms stand for "Transmission Control Protocol"/"Internet Protocol" and is the connection protocol used by the Internet.

Terahashes/sec: The number of hashing attempts possible in a given second, measured in trillions of hashes (thousands of Gigahashes).

Testnet: An alternative bitcoin blockchain, used purely for testing purposes.

Testnet3: The latest version of testnet with another genesis block.

Timestamp: A proof that a piece of data existed at a certain point in time. For Bitcoin this is the cryptographic proof of when transactions have taken place.

Tokenless Ledger: A tokenless ledger refers to a distributed ledger that doesn't require a native currency to operate.

TOR: An anonymous routing protocol, used by people wanting to hide their identity online.

Total Coin Supply: For many cryptocurrencies, there is a limit on the total number of coins that will ever come into existence, bitcoin's total supply is capped at 21 million coins.

Transaction: A piece of data, signed by an External Actor. It represents either a Message or a new Autonomous Object. Transactions are recorded into each block of the blockchain.

Transaction Block: A collection of transactions on the bitcoin network, gathered into a block that can then be hashed and added to the blockchain.

Transaction Database: From a purely technological perspective, blockchains are transaction databases. The hashes, keys and nodes all make up a distributed database that eschews centralized storage Transaction Fee: A small fee imposed on some transactions sent across the bitcoin network. The transaction fee is awarded to the miner that successfully hashes the block containing the relevant transaction.

Transaction Input: A part of a transaction that contains a reference to a previous transaction's output and a script that can prove ownership of that output. The script usually contains a signature and thus called scriptSig. Inputs spend previous outputs completely. So if one needs to pay only a portion of some previous output, the transaction should include extra change output that sends the remaining portion back to its owner (on the same or different address). Coinbase transactions contain only one input with a zeroed reference to a previous transaction and an arbitrary data in place of script.

Transaction Output: An output contains an amount to be sent and a script that allows further spending. The script typically contains a public key (or an address, a hash of a public key) and a signature verification opcode. Only an owner of a corresponding private key is able to create another transaction that sends that amount further to someone else. In every transaction, the sum of output amounts must be equal or less than a sum of all input amounts. See Change.

TX: see Transaction.

Txin: see Transaction Input.

Txout: see Transaction Output.

U

Ubiquity: Blockchains are everywhere; at this point in the alphabet that is not news. The open-source code, universally applicable architecture of blockchains, and their ability to distribute, anonymize, protect, and keep a perfectly accurate record of web transactions makes the technology a given.

Ubtc: One microbitcoin (0.000001 BTC).

Unconfirmed Transaction: Transaction that is not included in any block. Also known as "0-confirmation" transaction. Unconfirmed transactions are relayed by the nodes and stay in the mempools. Unconfirmed transaction stays in the pool until the node decides to throw it away, finds it in the blockchain, or includes it in the blockchain, or includes it in the blockchain itself (if it is a miner). See Confirmation Number.

Unique Node List: Other blockchains such as Ripple and Stellar rely on social networks for consensus and may recommend new participants (i.e., new nodes) to generate unique mode list.

Unpermissioned Ledgers: Unpermissioned ledgers such as Bitcoin have no single owner-indeed, they cannot be owned. The purpose of an unpermissioned ledger is to allow anyone to contribute data to the ledger and for everyone in possession of the ledger to have identical copies. This creates resistance which means that no actor can prevent a transaction from being added to the ledger. Participants maintain the integrity of the ledger by reaching a consensus about its state.

UTXO Set: A collection of Unspent Transaction Outputs. Typically used in discussions on optimizing an ever-growing index of transaction outputs that are not yet spent. The index is important to efficiently validate newly created transactions. Even if the rate of the new transactions remains constant, the time required to locate and verify unspent output grows. Possible technical solutions include more efficient indexing algorithms and a more performant hardware. BitcoinQT, for example, keeps only an index of outputs matching user's keys and scans the entire blockchain when validating other transactions. A developer of one web wallet service mentioned that they maintain the entire index of UTXO and its size was around 100 Gb when the blockchain itself was only Gb. Some people seek social methods to solve the problem. For instance, by refusing to relay or mine transactions that are considered dust (containing outputs smaller than a transaction fee required to mine/relay them).

V

Vanity Address: A bitcoin address with a desirable pattern, such as a name.

Varint: This term may cause confusion as it means different formats in different Bitcoin implementations. See CompactSize.

Velocity of Money: The velocity of money is an indicator of how quickly money received is then spent again. For bitcoin, we use "bitcoin days destroyed" to measure its velocity, this can indicate whether people are hoarding or spending their bitcoins.

Verification: Blockchains would not work as ledgers without verification. Much of this falls on miners, whose block creation software verifies hashes of transactions when bundling them into blocks. In cryptocurrency and banking scenarios, payment verification is also paramount. This verification happens through node communication in the distributed network, cross-checking a Bitcoin transaction against each node's blockchain data before sending it through.

Virgin Bitcoin: Bitcoins purchased as a reward for mining a block. These have not yet been spent anywhere.

Volatility: The measurement of price movements over time for a traded financial asset (including bitcoin).

W

Wallet: A method of storing bitcoins for later use. A wallet holds the private keys associated with bitcoin addresses. The blockchain is the record of the bitcoin amounts associated with those addresses.

Wallet: Just like a bill-and-coin wallet, this is a place to keep your digital currency. There are four types of cryptocurrency wallets:

1. Software Wallet. These are programs you load onto your desktop or laptop computer.
2. Mobile Wallet: These come in the form of applications you install on your smartphone or tablet computer. They usually include QR code scanning and phone-to-phone transfers for on-the-go transactions.
3. Web Wallet: These are usually gotten through exchanges, and stored on third-party servers via cloud computing. They can be accessed by any computing device.
4. Paper Wallet: Your digital currency can be printed out, usually in the form of QR codes, and these hard-copy cryptocurrency "bills" can be kept in a physical wallet just like traditional money.

Wire Transfer: Electronically transferring money from one person to another. Commonly used to send and retrieve fiat currency from bitcoin exchanges.

X

XBT: Informal currency code for 1 Bitcoin (defined as 100 000 000 Satoshis). Some people proposed using it for 0.01 Bitcoin to avoid confusion with BTC. There were rumors that Bloomberg tests XBT as a ticker for 1 Bitcoin, but currently there is only ticker XBTFUND for Second-Market's Bitcoin Investment Trust. See BTC.

XRP: Also known as Ripple, XRP is a global payments network built on blockchain that is marketed at international banks. XRP itself is the native currency organizations can use to represent flat currency, cryptocurrency, commodities, or any other unit of value. Ripple is one of the oldest examples of open payment protocols using blockchain, but there is a laundry list of companies with different APIs, platforms and distributed payments networks. Deloitte's Banking Industry Outlook recently released a report estimating that blockchain-based payment systems could equal the volume of the United States' Automated Clearing House (ACH) financial transactions network by 2020.

Z

Zerocoin: A protocol designed to make cryptocurrency transactions truly anonymous.

Zero-confirmation Transaction: A transaction in which the merchant is happy to provide a product or service before the bitcoin's transmission has been confirmed by a miner and added to the blockchain. It can carry a risk of double spending.

Zero-confirmation Transaction: The processing of data for cryptocurrency transactions can take anywhere from half a minute upward to over ten minutes in some cases. Though this is necessary in order to validate transactions, and guards against fraudulent activity such as double spending, the waiting period can be inconvenient for those involved in the transactions. As a result, some exchanges and businesses that deal with digital currency are offering "zero confirmation" transactions, which are almost immediately verified without waiting for the mining process to confirm the data block. Double spending, the practice in which a coin holder applies the same currency to two different transactions is a concern with zero confirmation transactions. Since cryptocurrency is not "attached" to the person spending it in any way, by the time their double spending is discovered through the mining process, they are long gone and untraceable. With the demand for zero confirmation transactions on the upswing, entrepreneurs in the cryptocurrency industry are looking at ways to instantly verify, or deny, transactions without having to wait for mining to take place. In the meantime, many businesses levy fees to offset the financial risk of zero confirmation transactions, and yet others are refusing to accept them until the technology catches up.

Z System: IBM is openly committed to advancing blockchain technology on many fronts, but the company has even gone as far as offering a Blockchain-as-a-Service (BaaS) platform for developers on the IBM Cloud, and integrating blockchain-based apps (created through the Hyperledger Project) on IBM z Systems. IBM even plans to leverage blockchains combined with Watson on the Watson IoT platform to make it possible for information from devices such as RFID-based locations, barcode-scan event, or device-reported data to be used with IBM's Blockchain and sync with distributed ledgers and smart contracts.

We claim:

1. A method for control of data in a system having segregated secure functions in a segregated secure entity unit for use by secure users of the system and public functions in a public interface portal for use by one or more public users of the system, the system including a cognitive computing unit, the cognitive computing unit using at least machine learning based on training input for training of the cognitive computing unit, the system generating digital content based on data input from one or more data sources, the data input being subject to transformation into output content for output from the system, comprising the steps of:

receiving instructions at the public interface portal regarding operation of the system from the one or more public users, the public interface portal including:

receiving instructions at a first interface and communicate output from the first interface to the one or more public users, the instructions including a data input of first content and the output including at least transformed second content, processing at least the first content into the transformed second content, interfacing with the public users via a graphical user interface (GUI) coupled to a processor, controlling by the processor and graphical user interface, enforcing behavior in the segregated secure entity unit, and interfacing the public functions via an application program interface (API) adapted to the secure function by sending one or more call requests to the segregated secure entity unit and receiving one or more responses from the segregated secure entity unit, and segregating the secure entity unit from the public interface portal, the segregated secure entity unit being accessible only to the secure users of the system, the segregated secure entity unit including:

receiving the one or more call requests from the application program interface (API) of the public interface portal, sending one or more responses from the segregated secure entity unit to the public interface portal, receiving at least in part the training input coupled to the cognitive computing unit for training of the cognitive computing unit, training the cognitive computing unit, at least using a machine learning unit for training of the cognitive computing unit, and transforming the first content into the transformed second content using the cognitive computing unit.

2. The method for control of data of claim 1 wherein the data input first content is text.

3. The method for control of data of claim 2 wherein the output second content is a machine translation of the text.

4. The method for control of data of claim 1 wherein the data input first content is audio content.

5. The method for control of data of claim 4 wherein the output second content is audio content of a chatbot.

6. The method for control of data of claim 4 wherein the audio content is music.

7. The method for control of data of claim 1 wherein the data input first content includes an image.

8. The method for control of data of claim 1 wherein the output second content is an image.

9. The method for control of data of claim 1 wherein the data input first content is game play data.

10. The method for control of data of claim 1 wherein the training during the machine learning is supervised learning.

11. The method for control of data of claim 1 wherein the training during the machine learning is non-supervised learning.

12. The method for control of data of claim 1 wherein the training during the machine learning is reinforcement learning.

13. The method for control of data of claim 1 wherein the machine learning utilizes a neural network.

14. The method for control of data of claim 1 wherein the training during the machine learning identifies structure.

15. The method for control of data of claim 1 wherein the training during machine learning identifies patterns.

16. The method for control of data of claim 1 wherein the machine learning utilizes hyperparameters.

17. The method for control of data of claim 1 wherein the training is trained at least in part with human input for training.

18. The method for control of data of claim 1 wherein the training is trained at least in part with Internet of Things (IOT) data.

19. The method for control of data of claim 1 wherein the data input of first content is video content.

20. The method for control of data of claim 1 wherein the transformed second content is video content.

* * * * *